(12) United States Patent
Lundsgaard et al.

(10) Patent No.: US 9,278,652 B1
(45) Date of Patent: *Mar. 8, 2016

(54) PHONE HOLDER

(71) Applicant: Allstate Insurance Company, Northbrook, IL (US)

(72) Inventors: Soren K. Lundsgaard, Iverness, IL (US); Joy A. Thomas, Glenview, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,854

(22) Filed: Feb. 19, 2015

Related U.S. Application Data

(63) Continuation-in-part of application No. 14/615,037, filed on Feb. 5, 2015.

(51) Int. Cl.
| | |
|---|---|
| *H04M 1/00* | (2006.01) |
| *H04B 1/18* | (2006.01) |
| *F16M 13/00* | (2006.01) |
| *B60R 7/06* | (2006.01) |
| *B60R 11/00* | (2006.01) |

(52) U.S. Cl.
CPC ......... *B60R 11/00* (2013.01); *B60R 2011/0042* (2013.01)

(58) Field of Classification Search
CPC ............... B60R 2011/0005; B60R 2011/0082; B60R 2011/0087
See application file for complete search history.

(56) References Cited

U.S. PATENT DOCUMENTS

| | | | |
|---|---|---|---|
| 5,995,622 | A | 11/1999 | Roussy et al. |
| 5,996,866 | A | 12/1999 | Susko et al. |
| 6,185,302 | B1 | 2/2001 | Rytkonen et al. |
| 6,243,463 | B1 | 6/2001 | Cheon |
| 6,269,258 | B1 | 7/2001 | Peiker |
| 6,464,185 | B1 | 10/2002 | Minelli et al. |
| 6,888,940 | B1 | 5/2005 | Deppen |
| 7,003,333 | B2 | 2/2006 | Chow et al. |

(Continued)

FOREIGN PATENT DOCUMENTS

WO 2006077460 A1 7/2006

OTHER PUBLICATIONS

Belkin Car Cup Holder Mount for iPhone—Apple Store (Canada), Sep. 1, 2015 [On-line], Retrieved from the internet: http://store.apple.com/ca/product/HH0K2ZM/A/belkin-car-cup-holder-mount-for-iphone.

(Continued)

*Primary Examiner* — Tammy Pham
*Assistant Examiner* — Frantz Bataille
(74) *Attorney, Agent, or Firm* — Banner & Witcoff, Ltd.

(57) ABSTRACT

An apparatus for holding a cell phone or a mobile phone in a vehicle that includes a cradle to receive a cell phone or mobile device. The cradle includes a base plate, a latch button, and a latch mechanism. The apparatus also includes a triangular hold securement system connected to the cradle, wherein the triangular hold securement system includes a first pair of dual grab posts, a second pair of dual grab posts, and a third grab post. The first pair of dual grab posts and the second pair of dual grab posts are positioned to contact and engage the corners along one of two long sides of the mobile device and the third grab post is positioned to contact and engage on the opposite long side of the mobile device.

20 Claims, 24 Drawing Sheets

(56) References Cited

U.S. PATENT DOCUMENTS

| | | | |
|---|---|---|---|
| 7,103,397 | B2 | 9/2006 | Oh |
| 7,274,788 | B2 | 9/2007 | Schanz et al. |
| 7,920,905 | B2 | 4/2011 | Bury |
| 8,487,169 | B2 | 7/2013 | Dunlop |
| 8,783,458 | B2 | 7/2014 | Gallagher et al. |
| 8,827,341 | B2 * | 9/2014 | Sofield .................... B60R 11/02 296/37.12 |
| 2003/0128840 | A1 | 7/2003 | Luginbill et al. |
| 2005/0135603 | A1 | 6/2005 | Stanford |
| 2008/0057889 | A1 * | 3/2008 | Jan ......................... H04B 1/034 455/185.1 |
| 2009/0294617 | A1 | 12/2009 | Stacey et al. |
| 2010/0035667 | A1 | 2/2010 | Bury |
| 2011/0163211 | A1 * | 7/2011 | Cicco ...................... B60R 11/02 248/158 |

OTHER PUBLICATIONS

Rotating Windscreen Car Mount Stand Holder for 7 inch Tablet PC GP . . . , SENDER.ASIA Largest Online Asian Marketplace, Sep. 1, 2015 [On-line], retrieved from the internet: http://www.sender.asia/showproduct_Rotating-Windscreen-Car-Mount- . . . .

360 Degree Rotating Suction Cup Car Mount Holder for Mobile Phone Tablet, Hytparts, Sep. 1, 2015 [On-line], retrievedfrom the internet: http://www.hytparts.com/004768-360-degree-rotating-suction-cup-car-mount-holder-for-mobile-phone-tablet.html.

Koomus CD-Eco CD slot Universal Smartphone Car Mount Holder Cradle, Sep. 1, 2015 [On-line] retrieved from the internet: http://www.koomus.com/products/cd-eco.

CT-8510S Mini Universal Stick Windshield Car Mount Holder for iPhone 5 / iPhone 4 & 4S / iPad mini 1 / 2 / 3 / New iPad / Samsung / HTC / Nokia / Other 2.5-10 inch Tablet PC, Support 360 Degree Rotation, SUNKSKY—CT-8510S Mini Universal Stick Windshield Car Mount Hol . . . , Sep. 1, 2015, [On-line], Retrieved from the internet: http://www.sunsky-online.com/product/default!view.do?subject.id=279434.

Heavy-Duty Universal Car Mount Holder, Sep. 1, 2015 [On-line], retrieved from the internet: http://www.eflystone.com/car-vehicle-electronics/175-heavy-duty-univ . . . .

Sep. 3, 2015—(US) Non-Final Office Action—U.S. Appl. No. 14/615,037.

* cited by examiner

PHONE HOLDER

This patent application is a continuation in part of U.S. application Ser. No. 14/615,037 filed Feb. 5, 2015, which is incorporated herein by reference in its entirety.

FIELD OF THE INVENTION

The present invention is directed towards an apparatus for holding a cell phone or mobile device in a vehicle, more specifically towards an apparatus for a phone cradle with rotary release.

BACKGROUND

Various designs of phone holders for vehicles have side and bottom contact points that may cover buttons or USB connections. Other various designs of phone holders for vehicles may provide side-by-side holding designs which may potentially force the phone off center. Other various designs of phone holders for vehicles may provide side-by-side holding designs that require and necessitate a large grabbing area. Other various phone holders for vehicles may not provide the ability to attach or remove the cell phone or mobile device with one hand. The problem solved by this invention may be one of a cell phone or mobile device enhancer correcting many of these problems identified above. A phone holder that holds the cell phone or mobile device or mobile device which does not cover the buttons and/or the USB connections is desired. The phone holder may also allow the user to attach or remove the cell phone or mobile device with one hand. The phone holder may also be intended to improve driver safety and holding the cell phone or mobile device in the cradle in a vehicle.

BRIEF SUMMARY OF THE INVENTION

The following presents a general summary of aspects of the invention. This summary is not intended as an extensive overview of the invention. It is not intended to identify key or critical elements of the invention or to delineate the scope of the invention. The following summary merely presents some concepts of the invention in a general form as a prelude to the more detailed description provided below.

In an aspect of the present invention, an apparatus for holding a cell phone or a mobile device in a vehicle may include: a cradle configured to receive a mobile device and a triangular hold securement system connected to the cradle. The cradle includes a base plate, a latch button, and a latch mechanism, wherein the latch button and the latch mechanism are defined on the base plate. The triangular hold securement system includes a first pair of dual grab posts, a second pair of dual grab posts, and a third grab post. The first pair of dual grab posts and the second pair of dual grab posts may be positioned to contact and engage the corners along one of two long sides of the mobile device and the third grab post may be positioned to contact and engage on the opposite long side of the mobile device. The first pair of dual grab posts may include a first corner post located on a top side of the mobile device and a second corner post located on a first side of the mobile device. The second pair of dual grab posts may include a third corner post located on a bottom side of the mobile device and a fourth corner post located on the first side of the mobile device. The first grab post and third grab post may be connected and one or more of the grab posts may be fixed. When a mobile device is inserted into the cradle, the mobile device may depress the latch button and release the latch mechanism thereby releasing the arm and biasing the grab posts towards the mobile device and securing the mobile device to the cradle. After a mobile device is secure in the cradle and when the mobile device is rotated, an axis of rotation may be about a corner of the mobile device near the first pair of dual grab posts or the second pair of dual grab posts to change the geometry of the grab posts such that the mobile device is released from the cradle. The first pair of dual grab posts and the third grab post may be connected by an arm and wherein when rotating the mobile device from a secure position in the cradle, the third grab post rotates while the first pair of dual grab posts and the second pair of dual grab posts remain fixed and the distance from the first pair of dual grab posts to the third grab post remains constant. Additionally, the third grab post may rotate about an axis of rotation around the first pair of dual grab posts in the direction of the mobile device rotation. The first pair of dual grab posts and the second pair of dual grab posts may be adjustable to a height and a width of the mobile device.

In another aspect of this invention, an apparatus for holding a cell phone or a mobile device in a vehicle may include a cradle configured to receive a cell phone, wherein the cradle includes a base plate, a latch button, and a latch mechanism, wherein the latch button and the latch mechanism are defined on the base plate. The phone holder may also include a triangular hold securement system connected to the cradle. The triangular hold securement system includes a first pair of dual grab posts, a second pair of dual grab posts, and a third grab post. The first pair of dual grab posts may include two corner posts positioned to contact and engage on a top corner of the cell phone along a first long side of the cell phone. The second pair of dual grab posts may include two corner posts positioned to contact and engage a bottom corner of the cell phone along the first long side of the cell phone. The third grab post may be positioned to contact and engage along a second long side of the cell phone opposite the first long side. The first pair of dual grab posts and the third grab post may be connected by an arm and a biasing element, wherein the arm, the biasing element, and the grab posts secure the cell phone to the cradle. After a cell phone is secure in the cradle and when the cell phone is rotated, the third grab post may rotate about a corner of the mobile device near one of the first pair of dual grab posts or the second pair of dual grab posts to change the geometry of the grab posts such that the cell phone is released from the cradle. Additionally, the two corner posts of the first pair of dual grab posts may include a first corner post located on a top side of the cell phone and a second corner post located on the first side of the cell phone. The two corner posts of the second pair of dual grab posts may include a third corner post located on a bottom side of the cell phone and a fourth corner post located on the first side of the cell phone.

In another aspect of this invention, an apparatus for holding a cell phone or a mobile device in a vehicle may include: a cradle configured to receive a mobile device and a triangular hold securement system connected to the cradle. The cradle may include a base plate, a latch button, and a latch mechanism, wherein the latch button and the latch mechanism are defined on the base plate. The triangular hold securement system may include a first corner support, a second corner support, and a grab post. The first corner support may be positioned to contact and engage a top corner of the mobile device along a top and a first long side of the mobile device. The second corner support may be positioned to contact and engage a bottom and the first long side of the mobile device. The grab post may be positioned to contact and engage along a second long side of the mobile device opposite the first long side. One of the corner supports may be connected by one or more arms and a linkage element to the grab post which provides biasing forces to the corner supports and the grab post to secure the mobile device to the cradle. When a mobile device is inserted into the cradle, the mobile device may depress the latch button and release the latch mechanism thereby releasing the one or more arms and biasing the corner supports and the grab post towards the mobile device and securing the mobile device to the cradle. After a mobile device is secure in the cradle and when the mobile device is rotated, the first corner support and the second corner support may remain fixed while the grab post rotates about an axis of rotation around a corner near the first corner support in the direction of the mobile device rotation such that the mobile device is released from the cradle.

BRIEF DESCRIPTION OF THE DRAWINGS

A more complete understanding of the present invention and certain advantages thereof may be acquired by referring to the following description in consideration with the accompanying drawings, in which like reference numbers indicate like features, and wherein.

The reader is advised that the attached drawings are not necessarily drawn to scale.

DETAILED DESCRIPTION OF THE INVENTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

Figure 1A:
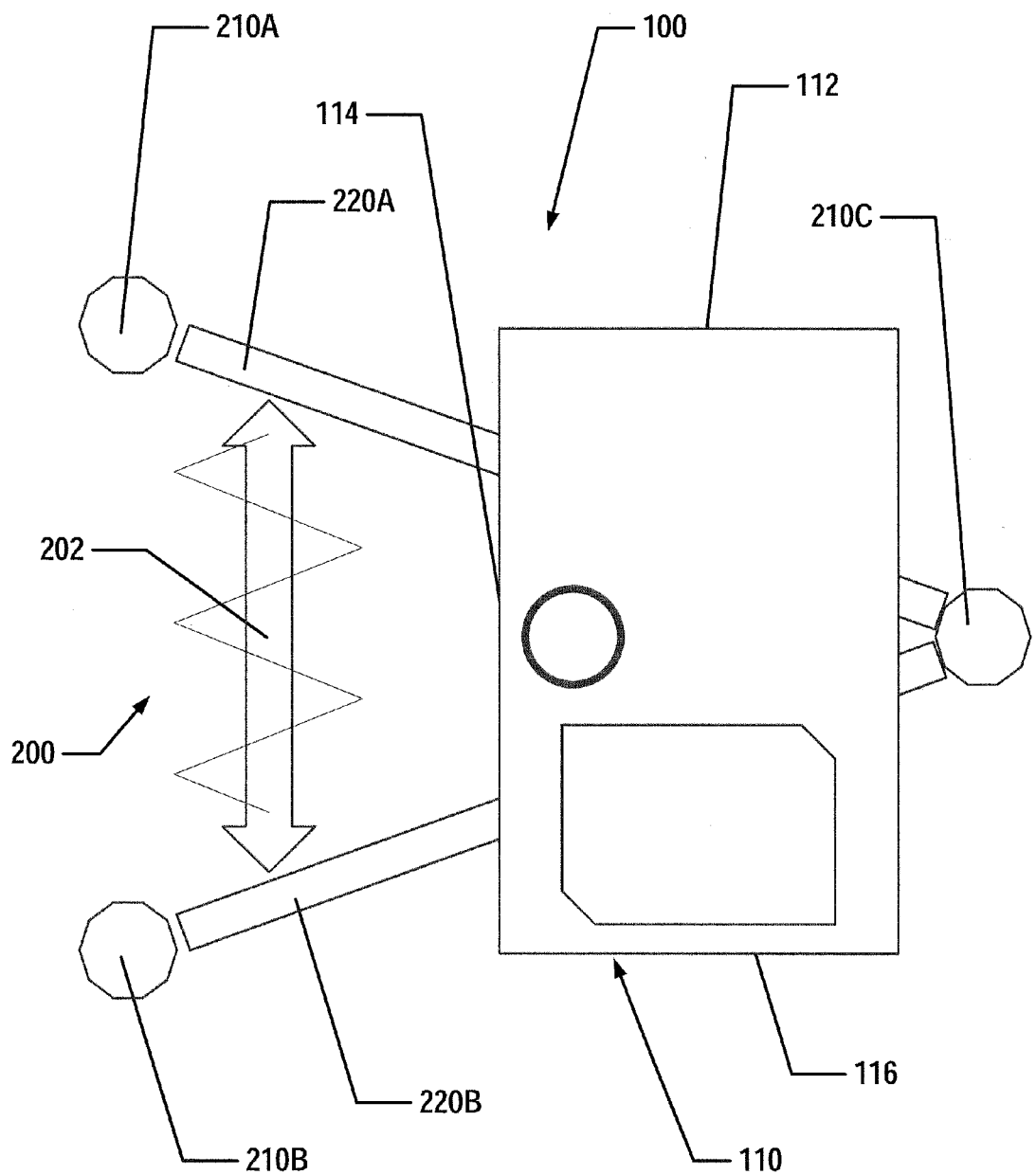
FIG. 1A illustrates a front plan view of an example phone holder in accordance with the present invention.
Figure 1B:
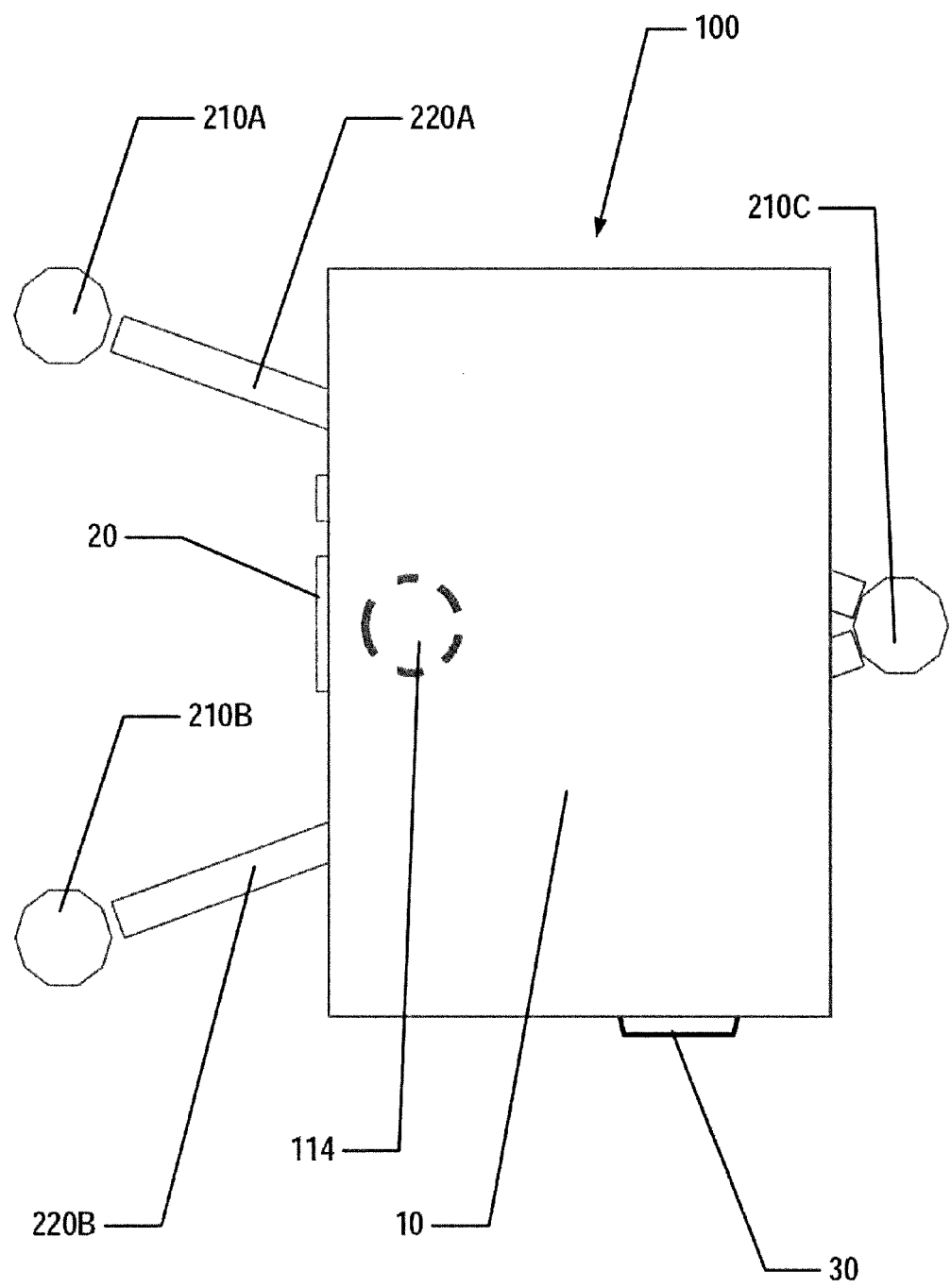
FIG. 1B illustrates a front plan view of the example phone holder shown in FIG. 1A with a cell phone or mobile device prior to engagement in accordance with this invention.
Figure 1C:
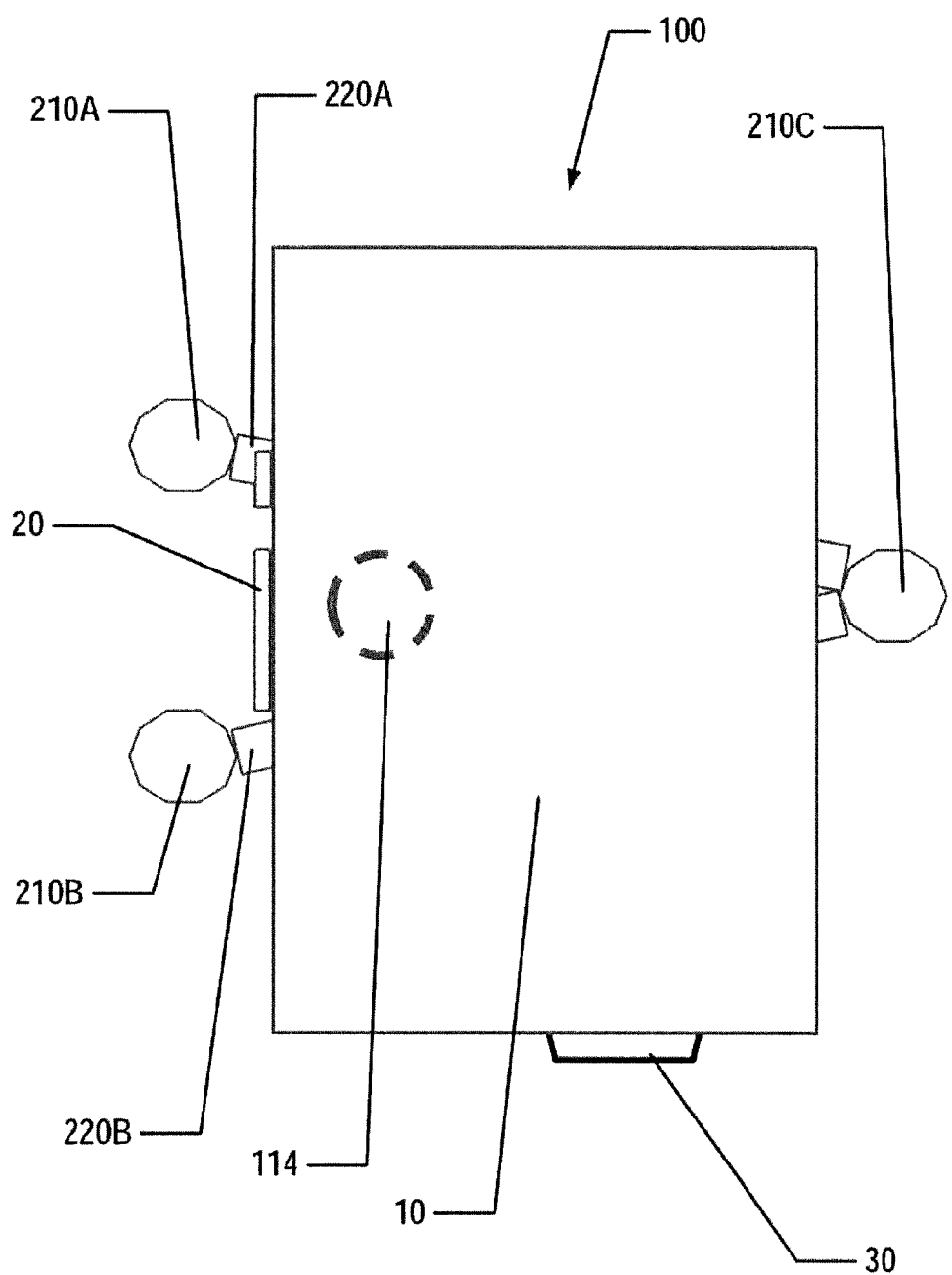
FIG. 1C illustrates a front plan view of the example phone holder shown in FIG. 1A with a cell phone or mobile device with the arm grab posts released in accordance with this invention.

FIGS. 1A through 1C illustrate a phone holder 100 for use with a cell phone or mobile device 10 in a vehicle. The phone holder 100 may be used with a cell phone or other mobile device utilized in a vehicle. The mobile device may be any mobile device that may be utilized for display in a vehicle, for example, such as a GPS device, a tablet, a computer, or other mobile device.

The phone holder 100 may be secured to the inside of a vehicle such that the driver and/or passenger can see the screen of the cell phone or mobile device 10. The phone holder 100 may be secured in a variety of different ways to the inside of the vehicle. For example, the phone holder 100 may be secured to the inside of the vehicle by the use of a suction mechanism attached to the windshield. In another example, the phone holder 100 may be secured to the inside of the vehicle by the use of an attachment mechanism to the dashboard, such as a suction mechanism or other mechanical connection to the dashboard. In another example, the phone holder 100 may be secured to the vent system of the vehicle by a mechanical means, such as a clip or vice securing mechanism. Other example ways to secure the phone holder 100 to the inside of the vehicle may be utilized with the phone holder 100 without departing from this invention.

As illustrated in FIGS. 1A through 1C, the phone holder 100 may include a cradle 110 and a securement system 200. The securement system 200 may be attached to, engaged with, or connected to the cradle 110 in a variety of mechanical methods, such as screwed, snapped, clipped, etc. The cradle 110 may receive a cell phone or mobile device 10. The cell phone or mobile device 10 may include buttons 20, such as volume buttons or other operative buttons that are usually located on one side of the cell phone or mobile device 10. The cell phone or mobile device 10 may also include a USB connection or power connection port 30 at the bottom of the cell phone or mobile device 10. The securement system 200, as described below in the various embodiments, may engage and hold the cell phone or mobile device 10 within the cradle 110.

The cradle 110, as illustrated in FIGS. 1A through 1C, may include a base plate 112, a release mechanism 114, and a latch mechanism 116. The release mechanism 114 may be in the form of a latch button 114 as is illustrated in FIGS. 1A through 1C. The latch button 114 and the latch mechanism 116 may be defined or located on the base plate 112. Also, the latch mechanism 116 may be located internal to the base plate 112. Additionally, the latch button 114 or latch mechanism 116 may be located external to the base plate 112. The base plate 112 may be various shapes to be configured to accept the cell phone or mobile device 10. For example, since most cell phones or mobile devices 10 are rectangular-shaped, the base plate 112 may be rectangular-shaped. However, the base plate 112 may be other shapes without departing from this invention, such as square, circular, oval, pentagon, octagon, or other possible irregular shapes not mentioned.

The release mechanism 114 or the latch button 114 may be located on the base plate 112 such that when the user presses the cell phone or mobile device 10 into the cradle 110 and against the base plate 112, the cell phone or mobile device 10 presses against the latch button 114. Generally, the latch button 114 may extend above the base plate 112 such that when the cell phone or mobile device is placed flat against the base plate 112, the latch button 114 is depressed. The latch button 114 may release the latch mechanism 116 allowing the grab posts 210 to move and grab and engage the cell phone or mobile device 10. Generally the latch button 114 may be located approximately on the center of the base plate 112 between the first grab post 210A, the second grab post 210B, and the third grab post 210C. As stated above, the latch button 114 or latch mechanism 116 may be located external to the base plate 112, such as located anywhere the cell phone or mobile device 10 touches the holder 100 when the cell phone or mobile device 10 is being inserted into the cradle 110. For example, the latch button 114 could be located on a contacting side of one of the first grab post 210A, the second grab post 210B, or the third grab post 210C.

The securement system 200 may include a triangular hold system. The triangular hold system may include a spring mechanism 202 or linkage elements and three grab posts (collectively listed as reference 210 and individually listed as reference numbers 210A, 210B, 210C). The three grab posts 210 may be connected by one or more arms 220A, 220B. The spring mechanism 202 or linkage elements (as will be described later) may spread the posts 210 during non-engagement of the cell phone or mobile device 10 and pull the grab posts 210 during the engagement of the cell phone or mobile device 10. When the latch button 114 is released, the spring mechanism 202 or linkage elements may force the posts 210 towards the cell phone or mobile device 10 for the securement of the cell phone or mobile device 10 in the cradle 110 and phone holder 100. The spring mechanism 202 may be any biasing element known and used in the art.

Figure 2A:
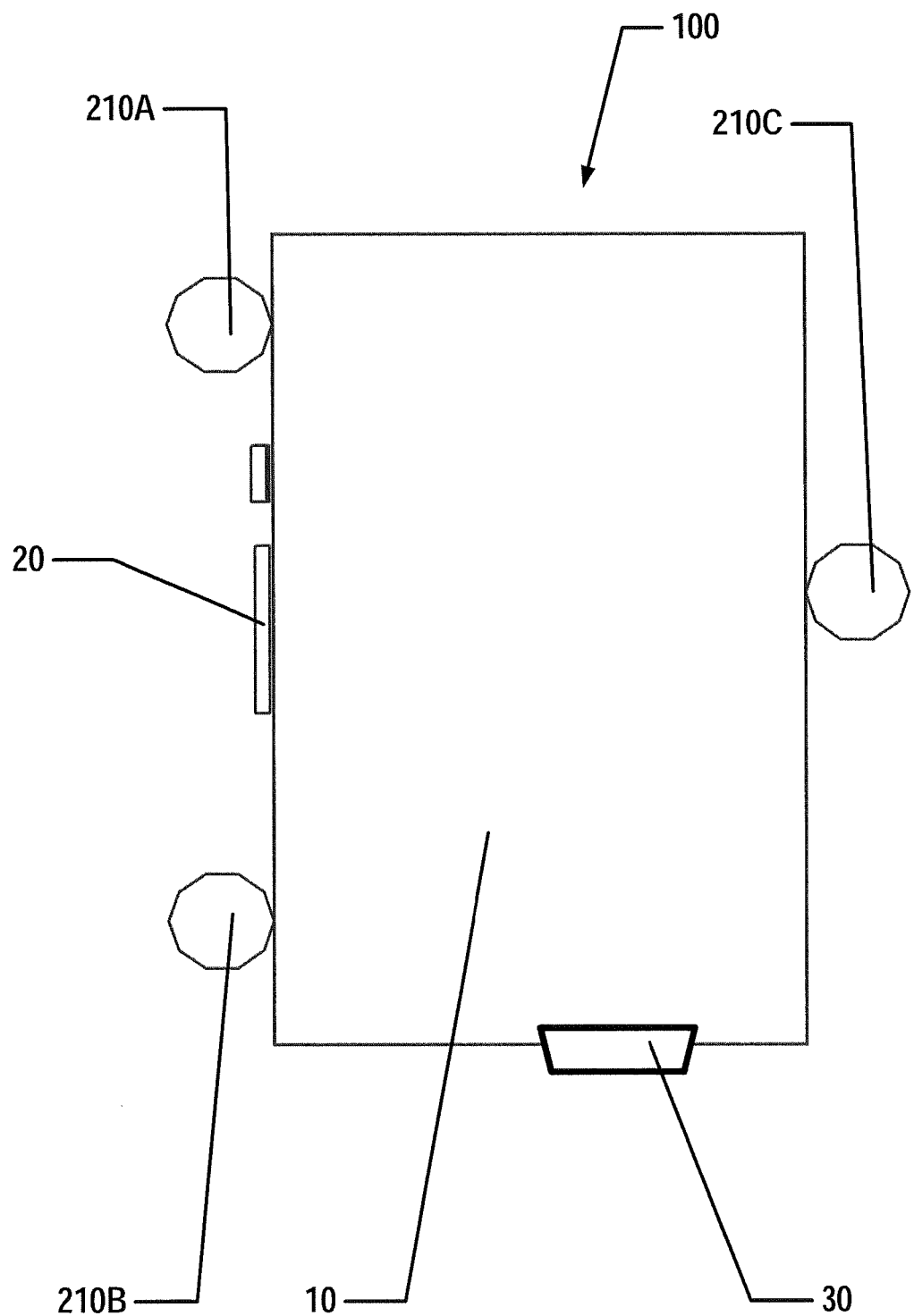
FIG. 2A illustrates a front plan view of the example phone holder shown in FIG. 1A with a cell phone or mobile device in accordance with this invention.
Figure 2B:
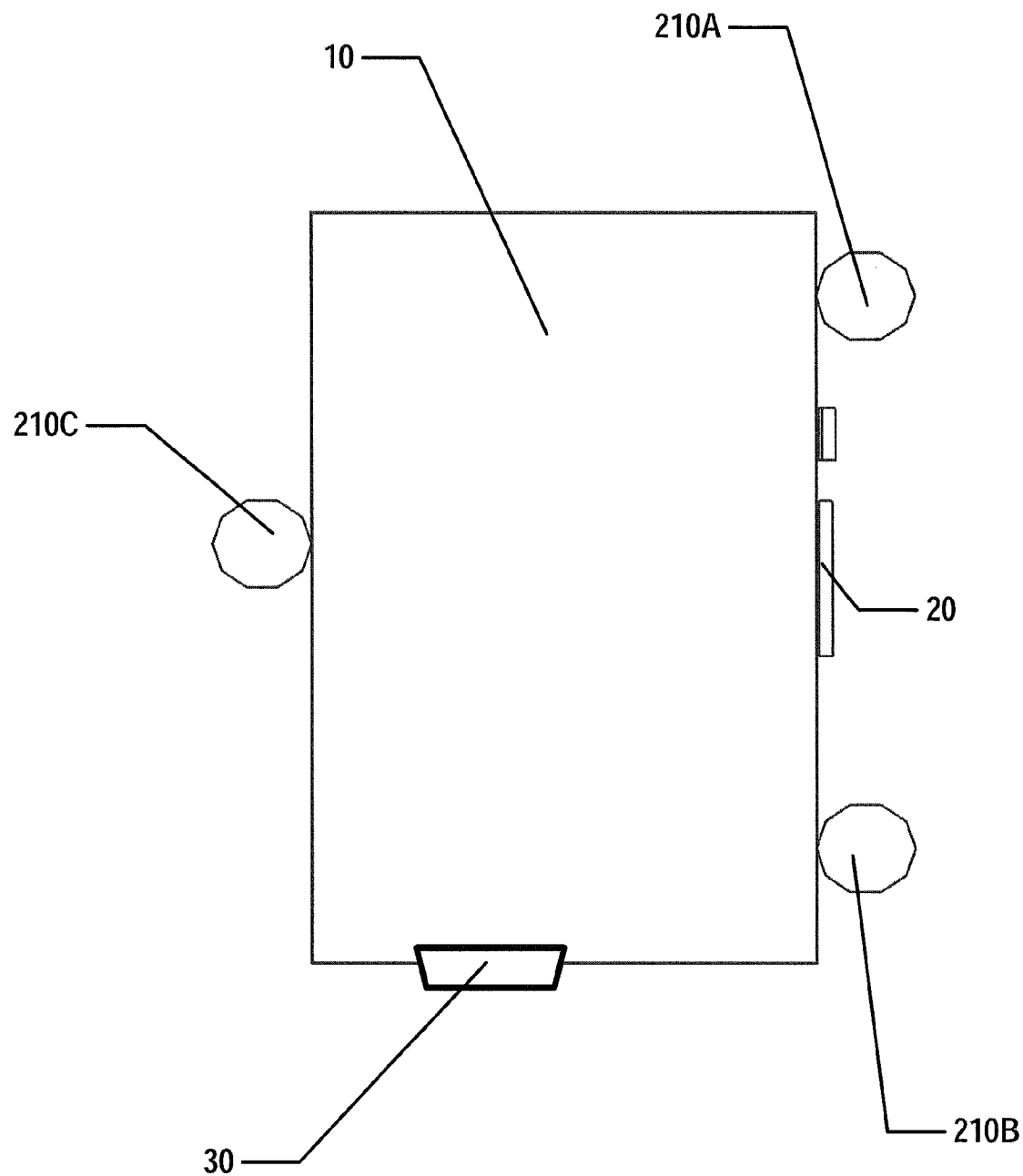
FIG. 2B illustrates a front plan view of the example phone holder shown in FIG. 1A in an opposite configuration from FIG. 2A with a cell phone or mobile device in accordance with this invention.

As illustrated in FIGS. 1A through 2B, the triangular hold system may include a first grab post 210A, a second grab post 210B, and a third grab post 210C. Each of the first grab post 210A, the second grab post 210B, and the third grab post 210C may be positioned to hold the long sides of the cell phone or mobile device 10. The first grab post 210A and the second grab post 210B may be positioned to contact and engage on one of the two long sides of the cell phone or mobile device 10. The third grab post 210C may be positioned to contact and engage on the opposite long side of the first grab post 210A and the second grab post 210B. FIG. 2A illustrates the first grab post 210A and the second grab post 210B located on the left side of the cell phone or mobile device 10 with the third grab post 210C located on the right side of the cell phone or mobile device 10 opposite the first grab post 210A and the second grab post 210B. FIG. 2B illustrates the first grab post 210A and the second grab post 210B located on the right side of the cell phone or mobile device 10 with the third grab post 210C located on the left side of the cell phone or mobile device 10 opposite the first grab post 210A and the second grab post 210B. Because the phone holder 100 can be rotated 360 degrees, the orientation of the third grab post 210C on the left or right side is not significant and will be shown in either rotation throughout the drawings.

As shown in FIGS. 2A and 2B, the grab posts 210 may be circular in shape. The grab posts 210 may be other shapes without departing from the invention, such as, half moon, square, hexagon, octagonal, or other irregular shapes without departing from this invention. Additionally, the grab posts 210 may also include flat areas. The grab posts shown in FIGS. 2A and 2B are circular in shape but have ten-flat sides to the circular post. The grab posts 210 may include other numbers of flat sides without departing from the invention. The flat sides on the grab posts 210 may help to hold or grip the sides of the cell phone or mobile device 10. Additionally, the grab posts 210 may be made of any resilient material, such as a soft rubber material without departing from this invention. Other materials may be utilized for the grab posts 210 without departing from this invention.

In another embodiment of the invention, and as shown in FIGS. 2A and 2B, the grab posts 210 may form an equilateral triangle. The angles of the grab posts 210 may be approximately 60 degrees. The angles of the grab posts 210 may also between 45 and 90 degrees without departing from the invention. Additionally, the angle between the first grab post 210A and the third grab post 210C may be equal to the second grab post 210B and the third grab post 210C, thereby creating an isosceles triangle between the grab posts 210.

The distance between the grab posts 210 when the grab posts 210 are engaged with the cell phone or mobile device 10 and in the locked position may be between approximately 3 and 5 inches. This distance may be dependent on the width of the cell phone or mobile device 10. For example, the distance between the first grab post 210A and the second grab post 210B may be between approximately 2 and 5 inches. The distance between the first grab post 210A and the third grab post 210C may be between approximately 2.5 and 4 inches. The distance between the second grab post 210B and the third grab post 210C may be between approximately 2.5 and 4 inches. Generally, the distance from the first grab post 210A and the second grab post 210B to the third grab post 210C will be equal, thereby forming an isosceles triangle.

Generally, the triangular hold system utilizing the three grab posts 210A, 210B, and 210C provides a number of benefits for holding rectangular-shaped objects or at least an object P with two parallel sides P1 and P2. For example, changing the angles and distances of the triangular hold system by rotating one or two points about an axis, the triangular hold system can hold (and release) different sized P objects. When the triangular hold system is holding an object P with points of contact on the parallel sides P1 and P2 of the object P, two points 210A and 210B will be on one parallel side P1 of the object P, and a third point 210C will be on the other parallel side P2 of the object P. The rule for a stable hold is that the line on a right angle from P1 and passing through 210A and 210C must intersect P1 between 210A and 210B. If this line does not intersect P1 between 210A and 210B, the hold will not be stable. The triangular hold system as disclosed with this invention follows these geometries and meets this criterion.

Additionally, the grab posts 210 may be slightly angled inward towards the cell phone or mobile device 10. With the grab posts 210 slightly angled inwards towards the cell phone or mobile device 10, a funnel effect may be created with the grab posts 210 and the cell phone or mobile device 10. The funnel effect may allow for the cell phone or mobile device 10 to be pulled in more and cause the grab posts 210 to grip the cell phone or mobile device 10 more.

Additionally, as the cell phone or mobile device 10 vibrates (either through the vibration mode of the cell phone or mobile device 10 or the vibration of the vehicle), the cell phone or mobile device 10 may become more engaged. This further engagement of the cell phone or mobile device 10 helps to stabilize the cell phone or mobile device 10 such that the stabilization allows for the analysis of the 3-axis accelerometer data from the cell phone or mobile device 10.

The cell phone or mobile device 10 may be rotated to remove the cell phone or mobile device 10 from the phone holder 100. When the user holds the cell phone or mobile device 10 and rotates the cell phone or mobile device 10 without touching the mount, one or more grab posts 210 move about an axis to change the geometry of the grab posts 210 such that the rectangular cell phone or mobile device 10 is no longer held by the phone holder 100. This action also opens the latch mechanism 114 and releases the cell phone or mobile device 10. The cell phone or mobile device 10 may be rotated left or right around a swivel axis. The latch mechanism 116 may latch to the open position as the user is already holding the cell phone or mobile device 10.

Figure 3A:
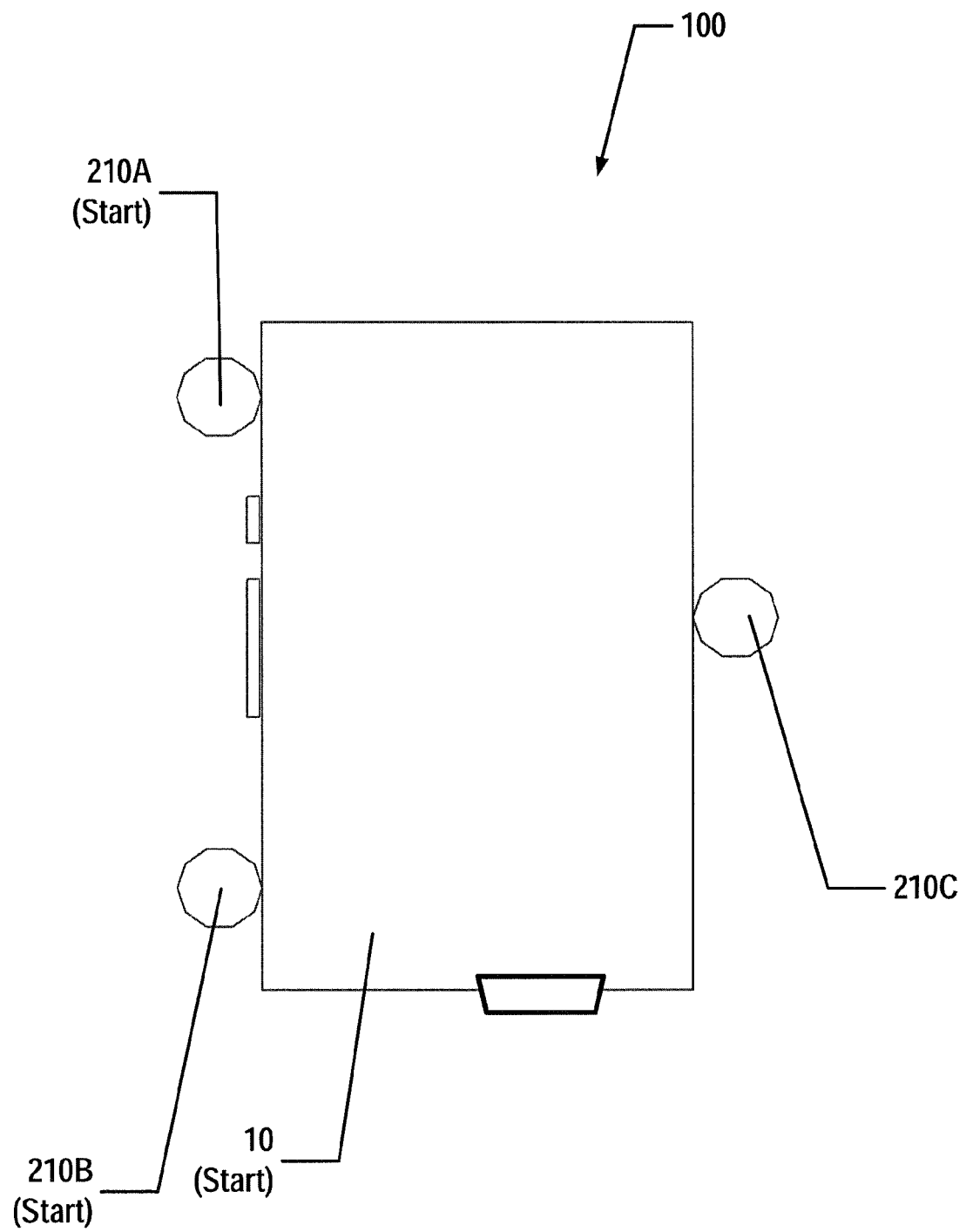
FIG. 3A illustrates a front plan view of the example phone holder shown in FIG. 1A showing the phone holder in a secure configuration in accordance with this invention.
Figure 3B:
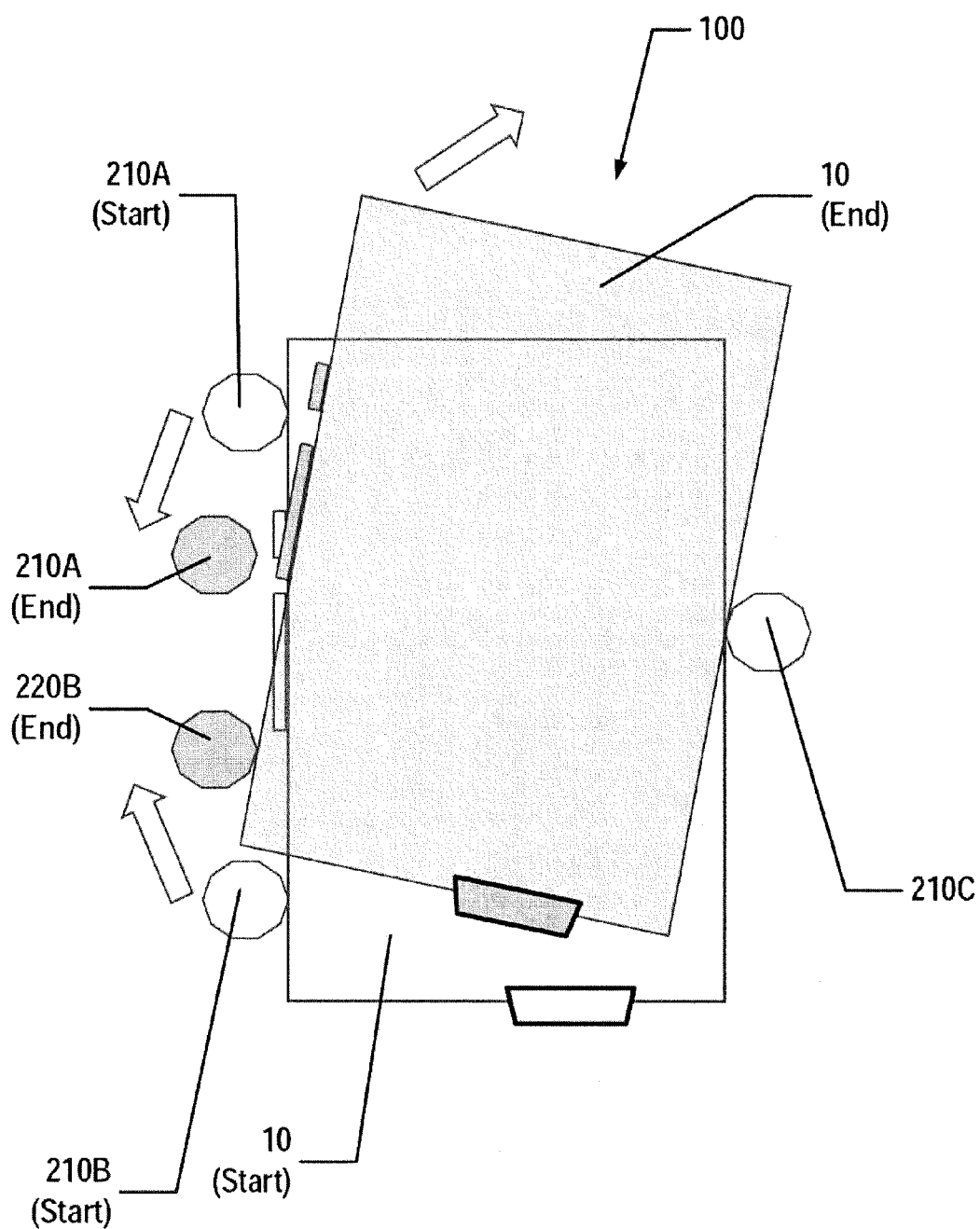
FIG. 3B illustrates a front plan view of the example phone holder shown in FIG. 1A with a secondary view showing the phone holder rotated in accordance with this invention.
Figure 3C:
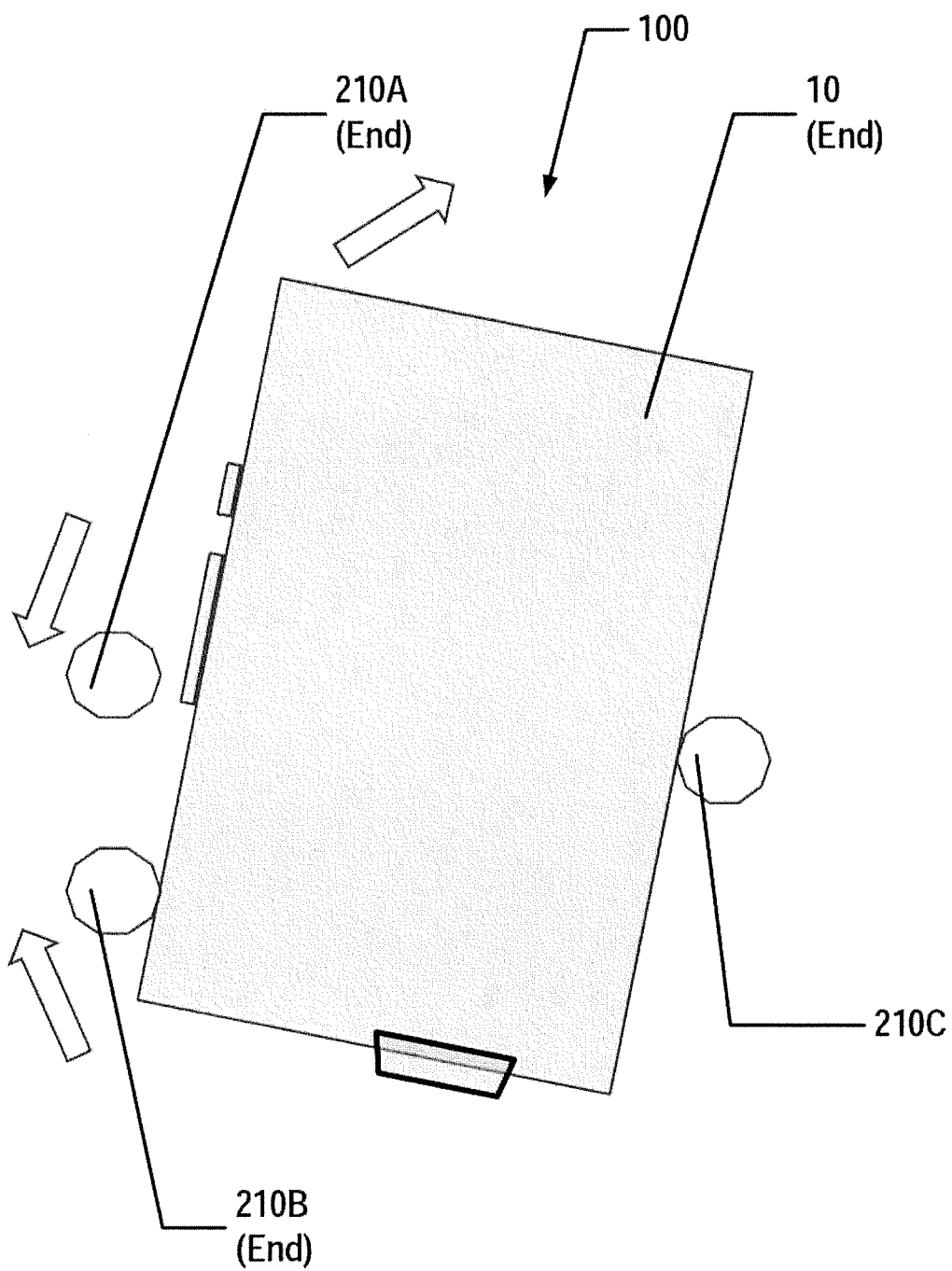
FIG. 3C illustrates a front plan view of the example phone holder shown in FIG. 1A in a released configuration in accordance with this invention.

FIGS. 3A through 3C illustrate the rotate release geometry of the securement system 200 when the cell phone or mobile device 10 is being released from the phone holder 100. As illustrated in FIG. 3A, in the starting position, as the user rotates the cell phone or mobile device 10 to the ending position, the cell phone or mobile device 10 is rotated about an axis of rotation about the third grab post 210C. When the release mechanism 114 is engaged, the grab posts 210 may rotate outward and then collapse inward. Additionally, as the user rotates the cell phone or mobile device 10 and when the cell phone or mobile device 10 is withdrawn, the latch button 114 resets and pops up to a re-engage position. FIG. 3B illustrates the securement system 200 and the grab posts 210 in the dis-engage position, thereby allowing the user to withdraw the cell phone or mobile device 10.

After rotating the cell phone or mobile device 10 and moving the grab posts 210A, 210B, the latch mechanism 116 opens, and the user can feel and hear the "un-latch." The audible and tactile "unlatch" when the cell phone or mobile device 10 can be removed from the phone cradle 110 and the latch button 114 can reset. The feeling of the "unlatch" may be important for people with hearing impairment or if hearing the unlatch is difficult because of outside noise. The feel may be created by including a detent which the spring mechanism 202 moves into when the cradle 110 is rotated into the un-latch position. In an example without departing from the invention, the feel could also be created by adjusting how the latching mechanism 116 changes the rotation force when un-latching.

To engage the cell phone or mobile device 10 into the phone holder 100, the user presses the cell phone or mobile device 10 into the cradle 110. The cell phone or mobile device 10 presses against the latch button 114, thereby locking the latch button 114 into the locked position, and thereby triggering the latching mechanism 116 to unlatch the two arms 220A, 220B from the open position to rotate symmetrically with the first grab post 210A and the second grab post 210B to hold the cell phone or mobile device 10 against the third grab post 210C.

Pressing the latch button 114 presses or engages the latch mechanism 116, which releases the arms 220A, 220B from the securement system 200. When the arms 220A, 220B move to engage the cell phone or mobile device 10, the arms 220A, 220B release the latch button 114 from the latch mechanism 116. The latch button 114 may no longer push on the latch mechanism 116. The latch mechanism 116 can re-engage when the user rotates to remove the cell phone or mobile device 10. When the user rotates the cell phone or mobile device 10 from the phone holder 100, the latch button 114 is still pressed down. The latch mechanism 116 does re-engage, but the latch button 114 is still pressed down. The latch button 114 may include an internal spring that resets to be above the surface of the base plate 112 after the user removes the cell phone or mobile device 10.

The triangular hold system may allow the entire phone holder 100 to rotate 360 degrees to allow the user to adjust the picture or screen on the cell phone or mobile device 10. For example, the triangular hold system allows the user the ability to configure landscape or portrait orientation such that the buttons 20 on the cell phone or mobile device 10 are located away from the grab posts 210. The orientation of the phone holder 100 may be moved or changed and rotated while the cell phone or mobile device 10 is not in the phone holder 10 and cradle 100. The present invention provides various methods for allowing the rotation to portrait/landscape position for the cell phone or mobile device 10.

First, a user may adjust the orientation of the phone holder 100 by removing the cell phone or mobile device 10, rotating to the cradle 110 or phone holder 10 to the new position, and then re-engaging the cell phone or mobile device 10. The orientation of the phone holder 10 may be locked while the cell phone or mobile device 10 is in the phone holder 100. The angular force required to rotate the phone holder 100 may be greater than the angular force to release the cell phone or mobile device 10 from the phone holder 100. The phone holder 100 may provide a singled-handed adjustment to the user.

In another embodiment, the user may push the phone holder 100 thereby releasing the brake and unlocking the phone holder 100 to rotate the phone holder 100 with the user's hand on the cell phone or mobile device 10. In another embodiment, the user may pull the phone holder 100 thereby releasing the brake and unlocking the phone holder 100 to rotate the phone holder 100 with the user's hand on the cell phone or mobile device 10. For rotation with the push and pulling of the phone holder 100, the phone holder 100 may include a spring-loaded telescoping connection and brake with teeth that engage at certain angles, or a clutch that disengages when the phone is pushed or pulled.

In another embodiment, the user may unlock a lever on the phone holder 100 to rotate the phone holder 100 thereby unlocking the phone holder 100, which requires the user moving the hand from the cell phone or mobile device 10. For the unlock lever, a lever may engage or disengage a clutch or set of teeth.

Additionally, in another embodiment, the phone holder 100 may include a "brake" which might be a friction brake or a pawl into a notched wheel which prevents rotation. In this embodiment, the friction to rotate may be greater than the torque to release the cell phone or mobile device 10 from the phone holder 100. The notched wheel may determine the number of orientation positions through the use of the notches on the wheel. The number of orientation positions may be adequate enough to satisfy a user.

Figure 4A:
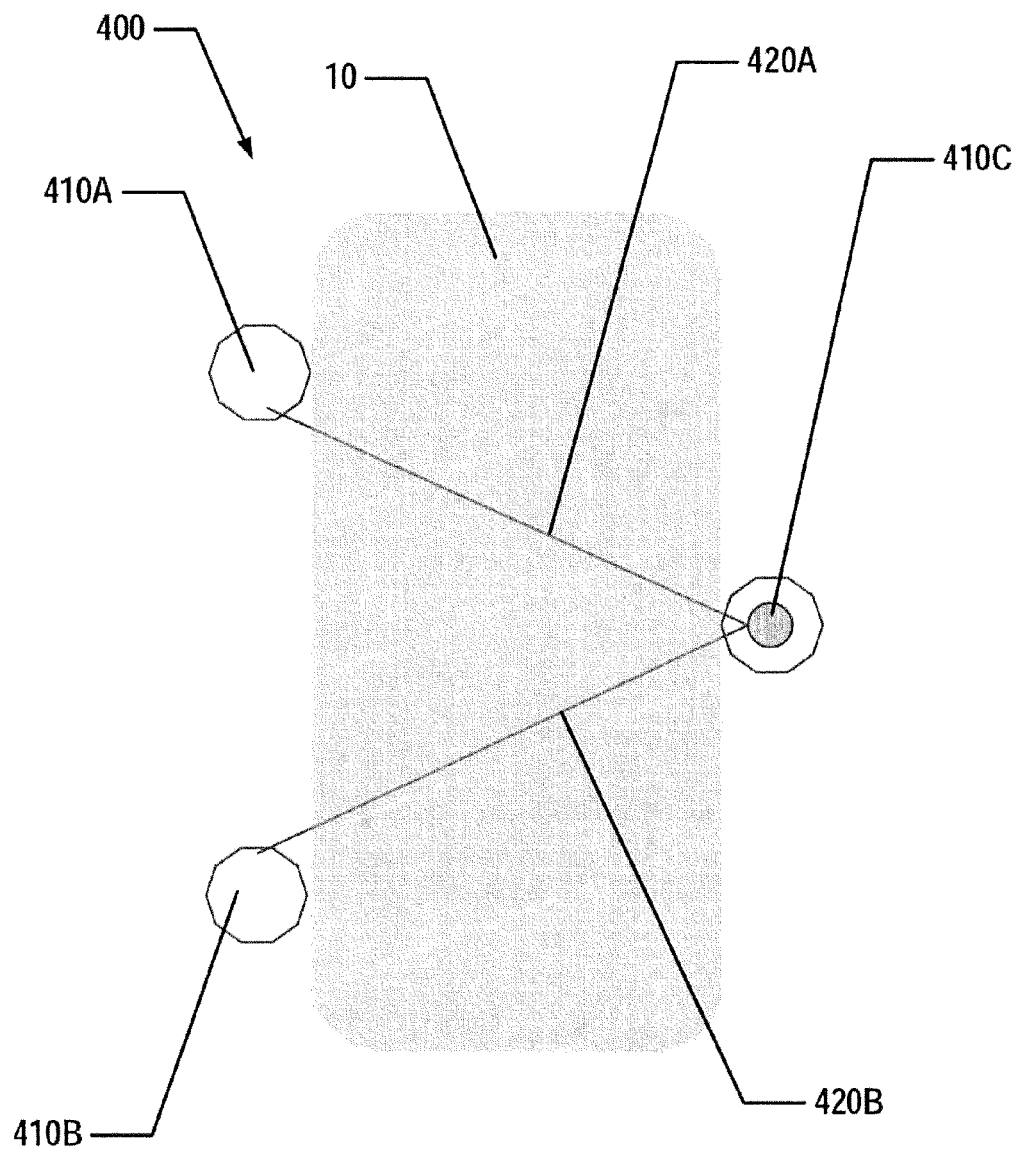
FIG. 4A illustrates a front plan view of an example phone holder showing an axis of rotation in accordance with this invention.
Figure 4B:
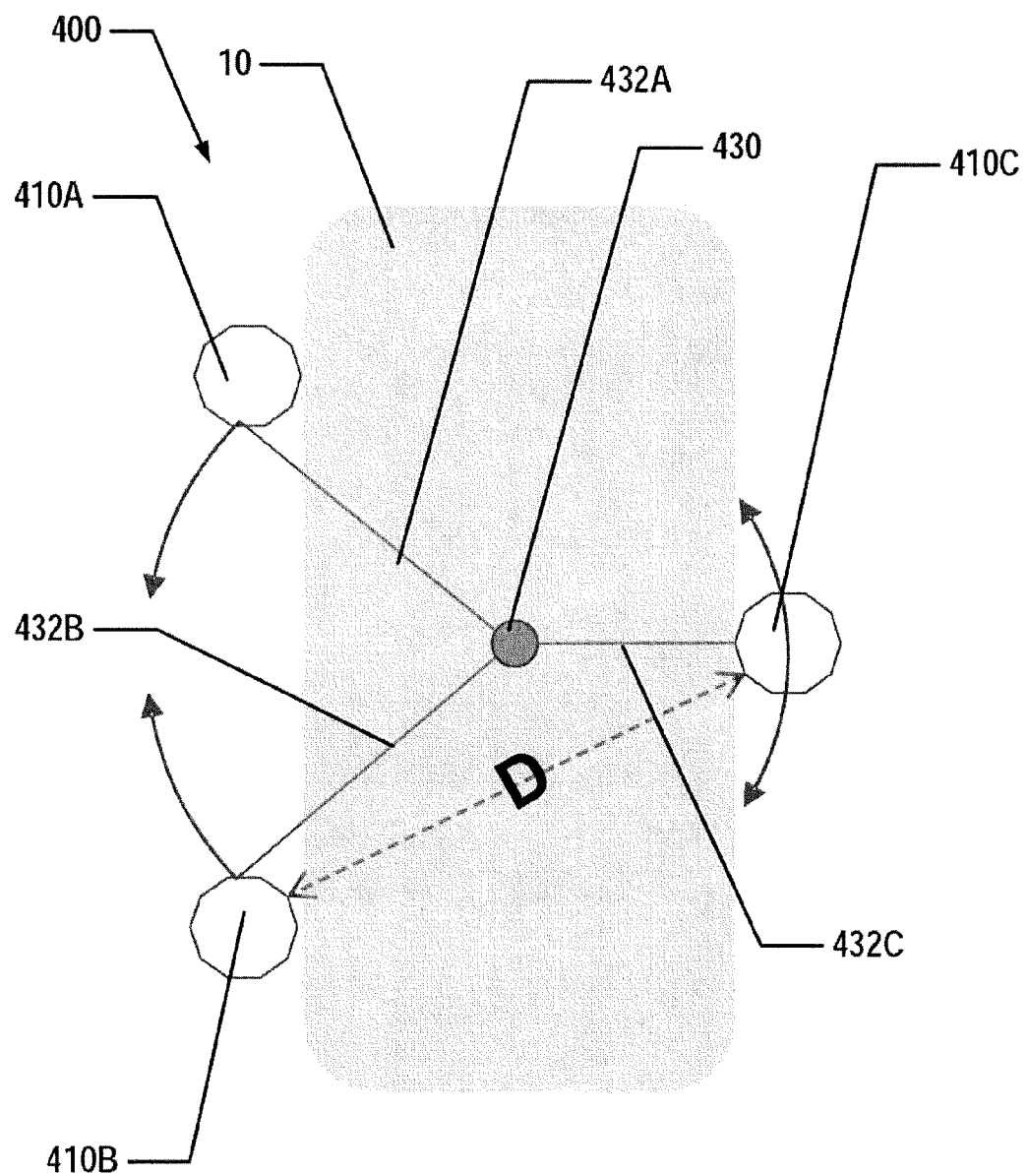
FIG. 4B illustrates a front plan view of an example phone holder showing a second axis of rotation in accordance with this invention.
Figure 4C:
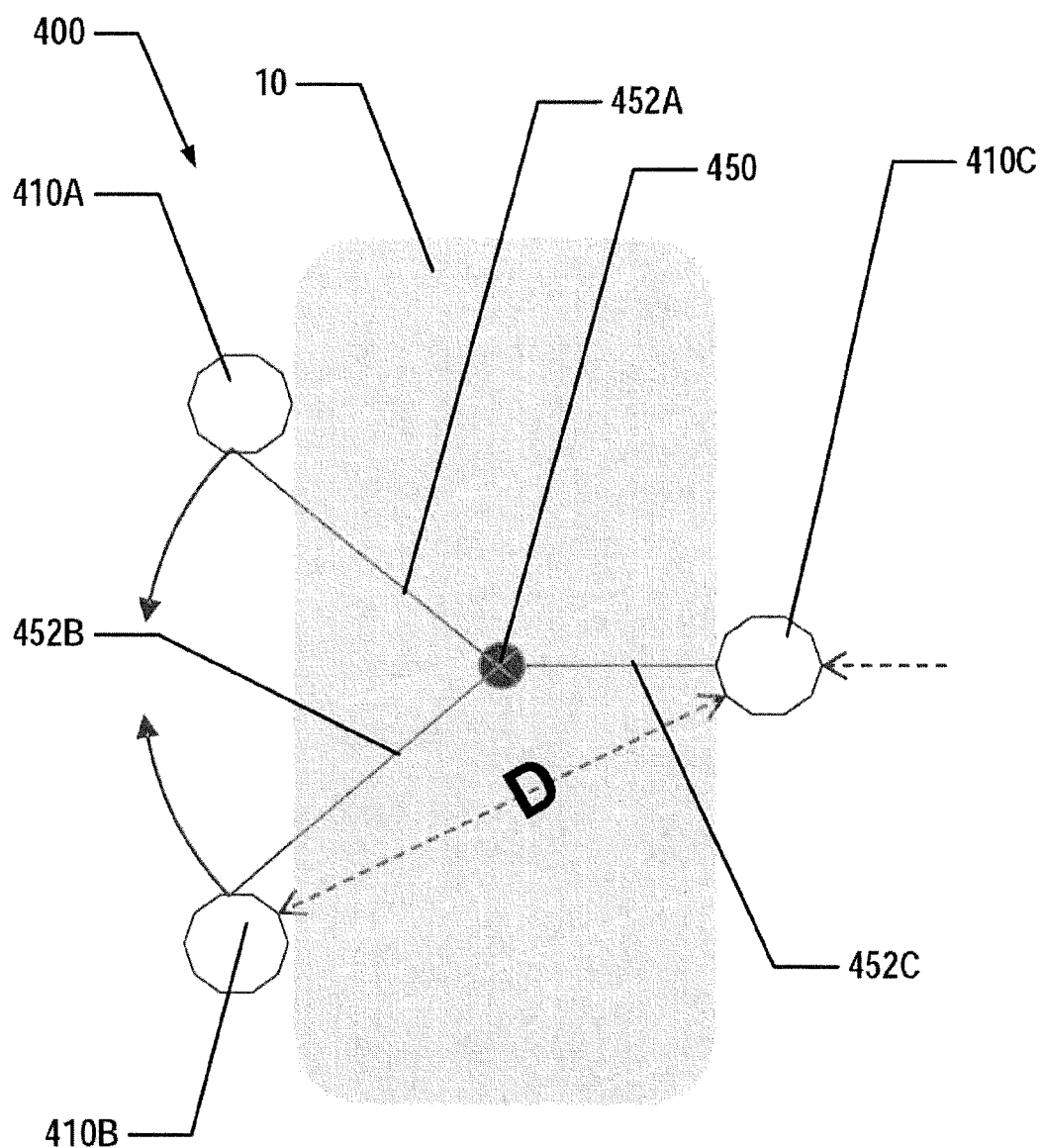
FIG. 4C illustrates a front plan view of an example phone holder showing a third axis of rotation in accordance with this invention.

FIGS. 4A through 4C illustrate various configurations of the geometric orientation of the grab posts as part of the securement system on a phone holder 400. The phone holder 400 is described according to this invention similar to that described above in conjunction with FIGS. 1 through 3C (the same or similar reference numbers are used in FIGS. 4A through 4C as those used in FIGS. 1 through 3C to denote the same or similar parts).

In one alternative configuration, as illustrated in FIG. 4A, a phone holder 400 may include a first grab post 410A, a second grab post 410B, and a third grab post 410C. The third grab post 410C may be connected to an arm 420A with the first grab post 410A and connected to a second arm 420B with the second grab post 410B. When removing the cell phone or mobile device 10 with clockwise rotation, the distance from the first grab post 410A to the third grab post 410C must remain constant, thereby rotating around the third grab post 410C. Additionally, when removing the cell phone or mobile device 10 with counter-clockwise rotation, the distance from the second grab post 410B to the third grab post 410C must remain constant. The axis of rotation may be around the third grab post 410C.

Table 1 below illustrates exemplary geometry and distances between the three grab posts 410A, 410B, 410C for the phone holder illustrated in FIGS. 4A and 6A. These dimensions are based on various example phone width distances and dimensions. The example phone dimensions are those of example cell phones or mobile devices as known and used in the art. Other phone dimensions with width and length may be utilized with this invention without departing from this invention. Generally, the distance from the first grab post 410A to the third grab post 410C is equal to the distance from the second grab post 410B to the third grab post 410C, with the cell phone or mobile device 10 rotating about the third grab post 410C. Additionally, utilizing Pythagoras, the distance between the first grab post 410A and the second grab post 410B can be represented below:

$$d(A,B)=2*\mathrm{sqrt}[d(A,C)^2-w^2]$$

wherein:
- d(A,B)—distance between grab post 410A and grab post 410B
- d(A,C)—distance between grab post 410A and grab post 410C
- w—width of the cell phone or mobile device 10

TABLE 1

Figure 6A:
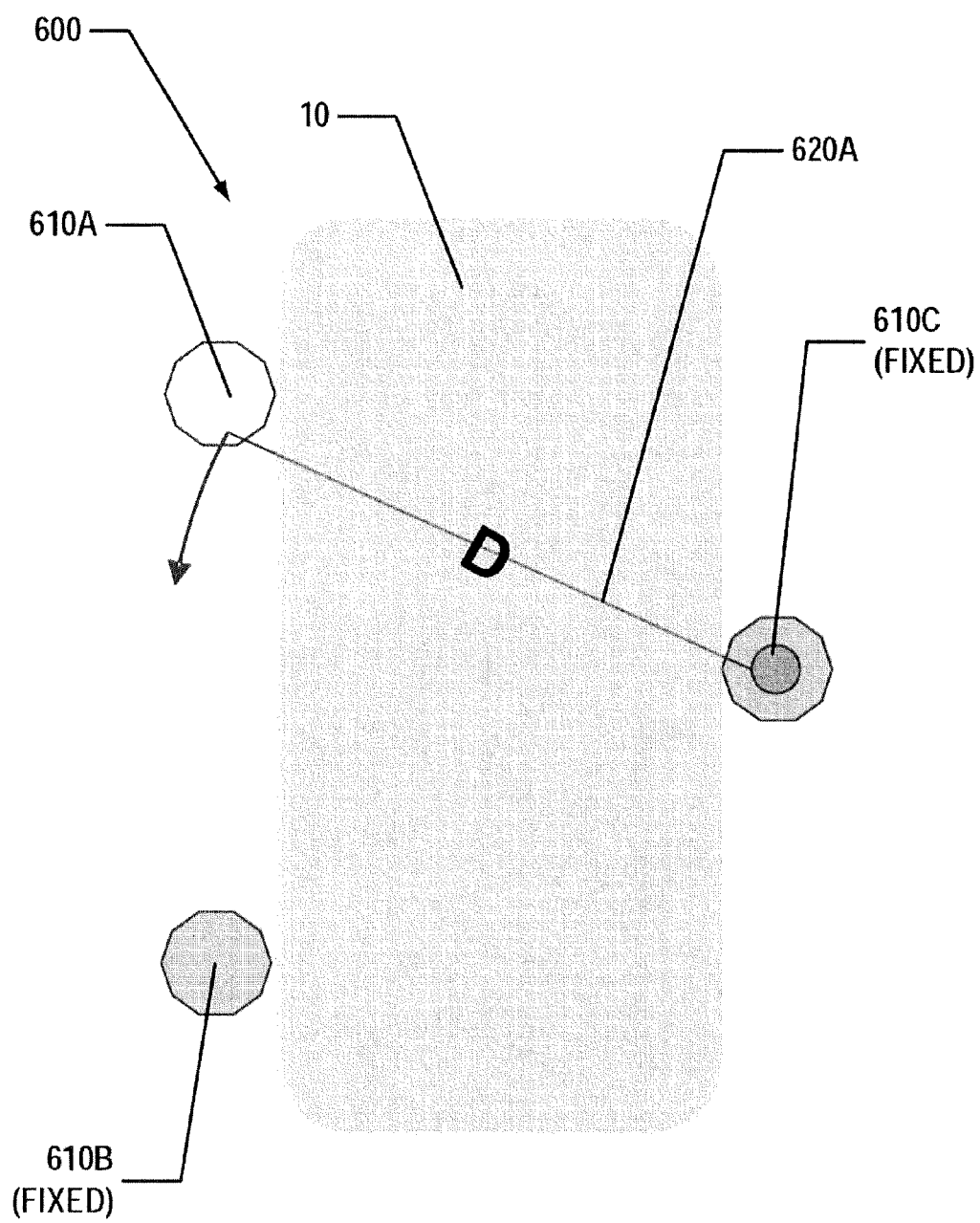
FIG. 6A illustrates a front plan view of another phone holder with a cell phone or mobile device in accordance with this invention.

(corresponding to FIGS. 4A and 6A)

| Cell phone width (w) [inches] | Cell phone height [inches] | d(A, C) [inches] | d(A, B) [inches] |
|---|---|---|---|
| 2.78 | 5.38 | 3 | 2.26 |
| 2.75 | 5.38 | 3 | 2.40 |
| 3.12 | 5.95 | 3.5 | 3.17 |
| 2.57 | 4.96 | 3 | 3.10 |
| 3.17 | 5.95 | 3.5 | 2.97 |
| 2.85 | 5.59 | 3 | 1.87 |
| 2.32 | 4.49 | 2.5 | 1.86 |
| 2.22 | 4.4 | 2.5 | 2.30 |
| 2.69 | 5.41 | 3 | 2.66 |
| 2.5 | 4.7 | 3 | 3.32 |
| 2.31 | 4.54 | 3 | 3.82 |
| 2.64 | 5.44 | 3 | 2.85 |
| 3.06 | 6.22 | 3.5 | 3.40 |

FIG. 4B illustrates another embodiment or alternative geometric orientation of the phone holder 400 and the grab posts 210. As illustrated in FIG. 4B, the cell phone or mobile device 10 rotates around a center pivot point 430. The third grab post 410C may be connected to an arm 432C sharing the axis with a first arm 432A to the first grab post 410A and a second arm 432B to the second grab post 410B. In this embodiment, the rotation of the cell phone or mobile device 10 may be around an axis or center pivot point 430 in the center of the phone holder 400 or mount. In this embodiment, as illustrated in FIG. 4B, as the first grab post 410A or the second grab post 410B rotate inward (depending on the rotation direction—clockwise or counter-clockwise), the third grab post 410C also rotates, thereby maintaining a constant distance D between the third grab post 410C and the rotating grab post. As described above, when removing the cell phone or mobile device 10 with clockwise rotation, the second grab post 410B rotates and the distance from the second grab post 410B to the third grab post 410C remains constant. Additionally, when removing the cell phone or mobile device 10 with counter-clockwise rotation, the first grab post 410A rotates and the distance from the first grab post 410A to the third grab post 410C remains constant. With this configuration, when the cell phone or mobile device 10 is not in the phone holder 400, the grab post that freely rotates for removal could be locked while the cell phone or mobile device 10 is not in the phone holder 400. This locking may be because when the cell phone or mobile device 10 is inserted, the grab post that freely rotates is most nearly at the point where the other two grab posts grab with the greatest distance between them.

FIG. 4C illustrates another embodiment or alternative geometric orientation of the phone holder 400 and the grab posts 410. As illustrated in FIG. 4C, the phone holder 400 includes a pivot point 450 that the cell phone or mobile device 10 rotates about. The third grab post 410C may be connected to an arm 452C sharing the axis with a first arm 452A to the first grab post 410A and with a second arm 452B to the second grab post 410B at a grab point 450 in the center of the base plate 112. A spring mechanism may provide a linkage telescope between the third grab post 410C and the center pivot point 450. The third grab post 410C may telescope to assist with the tension of the grab posts 410A, 410B and the cell phone or mobile device 10. The first grab post 410A and the second grab post 410B may rotate about the pivot point 450 in the center of the base plate 112 (depending on the rotation of the cell phone or mobile device 10). The spring mechanism may pull the third grab post 410C to the center pivot point 450 upon the engage and pushing down of the latch button 114 during the engagement of the cell phone or mobile device 10 in the cradle 110 and engaging the latch mechanism 116. In this embodiment, as illustrated in FIG. 4C, as the first grab post 410A or the second grab post 410B rotate inward (depending on the rotation direction—clockwise or counter-clockwise), the third grab post 410C telescopes outward, thereby maintaining a constant distance D between the third grab post 410C and the rotating grab post. When removing the cell phone or mobile device 10 with clockwise rotation, the second grab post 410B rotates and the distance from the second grab post 410B to the third grab post 410C must remain constant. Additionally, when removing the cell phone or mobile device 10 with counter-clockwise rotation, the first grab post 410A rotates and the distance from the first grab post 410A to the third grab post 410C must remain constant.

Table 2 below illustrates exemplary geometry and distances between the three grab posts 410A, 410B, 410C for the phone holder illustrated in FIGS. 4B, 4C, and 6B. These dimensions are based on various example phone width distances and dimensions. The example phone dimensions are those of example cell phones or mobile devices as known and used in the art. Other phone dimensions with width and length may be utilized with this invention without departing from this invention. Generally, the distance from the first grab post 410A to the center pivot point 430 is equal to the distance from the second grab post 410B to the center pivot point 430. The distance from the center pivot point 430 to the third grab post 410C is fixed with grab post 410A, grab post 410B, and grab post 410C rotating about the center pivot point 430. Additionally, utilizing Pythagoras, the distance between the first grab post 410A and the second grab post 410B can be represented below:

$$d(A,B) = 2 * \text{sqrt}[d(A,D)^2 - (w - d(C,D))^2]$$

wherein: d(A,B)—distance between grab post 410A and grab post 410B
  d(A,D)—distance between grab post 410A and pivot point 430
  d(C,D)—distance between grab post 410C and pivot point 430
  w—width of the cell phone or mobile device 10

TABLE 2

Figure 6B:
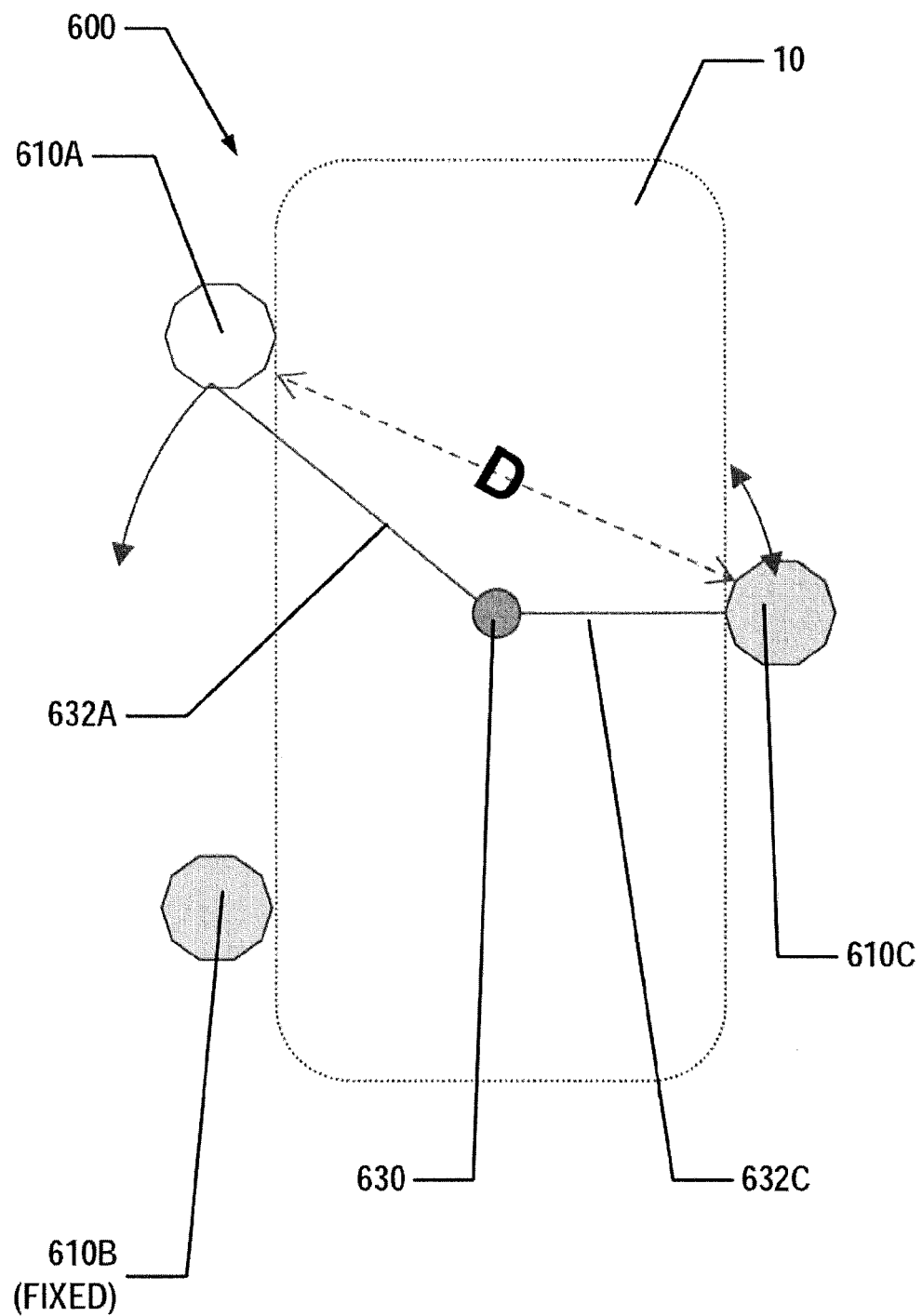
FIG. 6B illustrates a front plan view of another phone holder with a cell phone or mobile device in accordance with this invention.

(corresponding to FIGS. 4B, 4C and 6B)

| Cell phone width (w) [inches] | Cell phone height [inches] | d(A, D) [inches] | d(C, D) [inches] | d(A, B) [inches] |
|---|---|---|---|---|
| 2.78 | 5.38 | 2 | 1 | 1.82 |
| 2.75 | 5.38 | 2 | 1 | 1.94 |
| 3.12 | 5.95 | 2 | 2 | 3.31 |
| 2.57 | 4.96 | 2 | 1 | 2.48 |
| 3.17 | 5.95 | 2 | 2 | 3.24 |
| 2.85 | 5.59 | 2 | 1 | 1.52 |
| 2.32 | 4.49 | 2 | 1 | 3.01 |
| 2.22 | 4.4 | 3 | 2 | 5.98 |
| 2.69 | 5.41 | 2 | 1 | 2.14 |
| 2.5 | 4.7 | 2 | 1 | 2.65 |
| 2.31 | 4.54 | 2 | 1 | 3.02 |
| 2.64 | 5.44 | 2 | 1 | 2.29 |
| 3.06 | 6.22 | 2 | 2 | 3.39 |

As described above for the arm rotation symmetry, the arms holding the first grab post 410A and the second grab post 410B should rotate symmetrically about their common axis with a linkage. Without departing from this invention, the linkage may be various mechanical linkages as illustrated in FIGS. 5A and 5B.

Figure 5A:
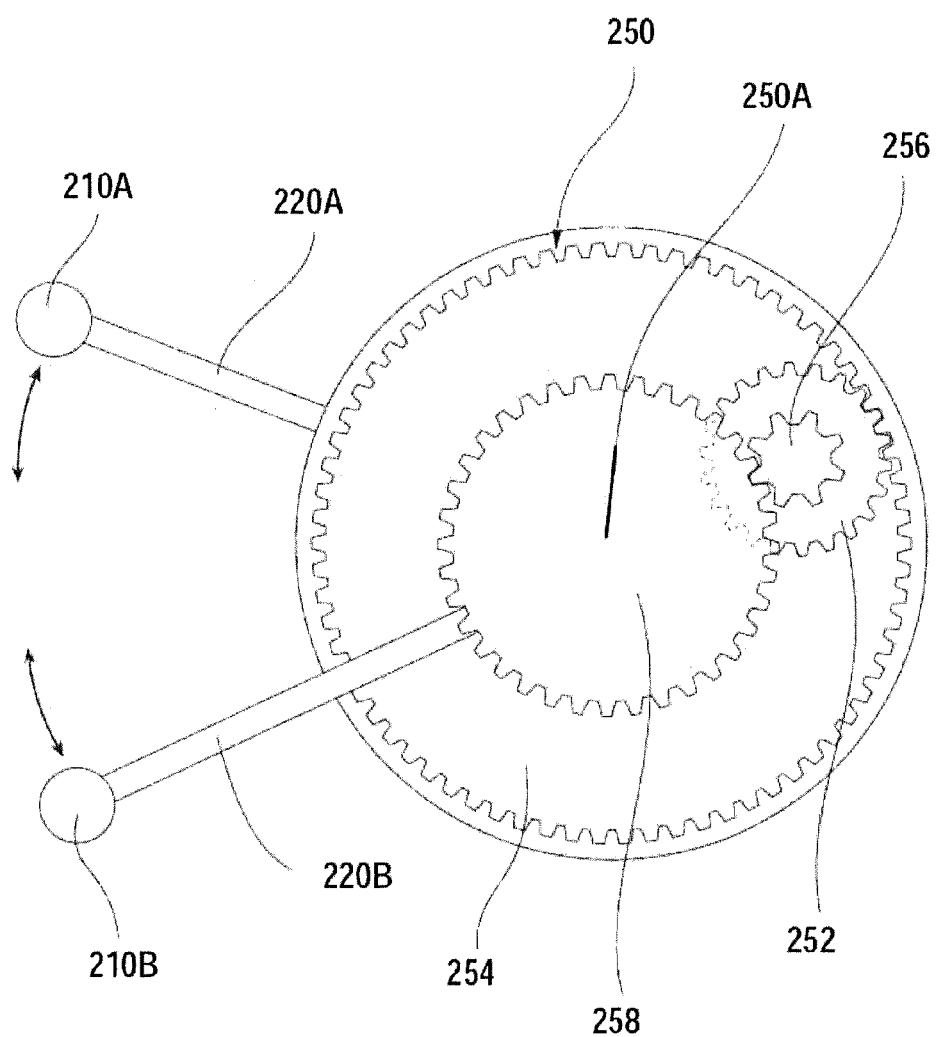
FIG. 5A illustrates a front plan view of an example phone holder showing an exemplary linkage system in accordance with this invention.

FIG. 5A illustrates a pinion gear linkage 250 between first grab post 210A and the second grab post 210B. As specifically illustrated in FIG. 5A, the arms 220A, 220B holding the first grab post 210A and the second grab post 210B are rotated symmetrically about their common axis 250A with a pinion gear linkage 250. With the pinion gear linkage 250, all gear teeth should have the same spacing. As illustrated in FIG. 5A, an outer pinion gear 252 is connected to an outer gear 254 for a first arm 220A to the first grab post 210A. An inner pinion gear 256 is connected to an inner gear 258 for a second arm 220B to the second grab post 210B. The outer pinion gear 252 and inner pinion gear 256 are connected on a fixed axis. The ratio of the outer pinion gear 252 and the inner pinion gear 256 is related to the radii of the inner gear 258 and outer gear 254:

$$R_{OUTER\ 252}/R_{INNER\ 256} - G_{INNER\ 258}/G_{OUTER\ 254}$$

Figure 5B:
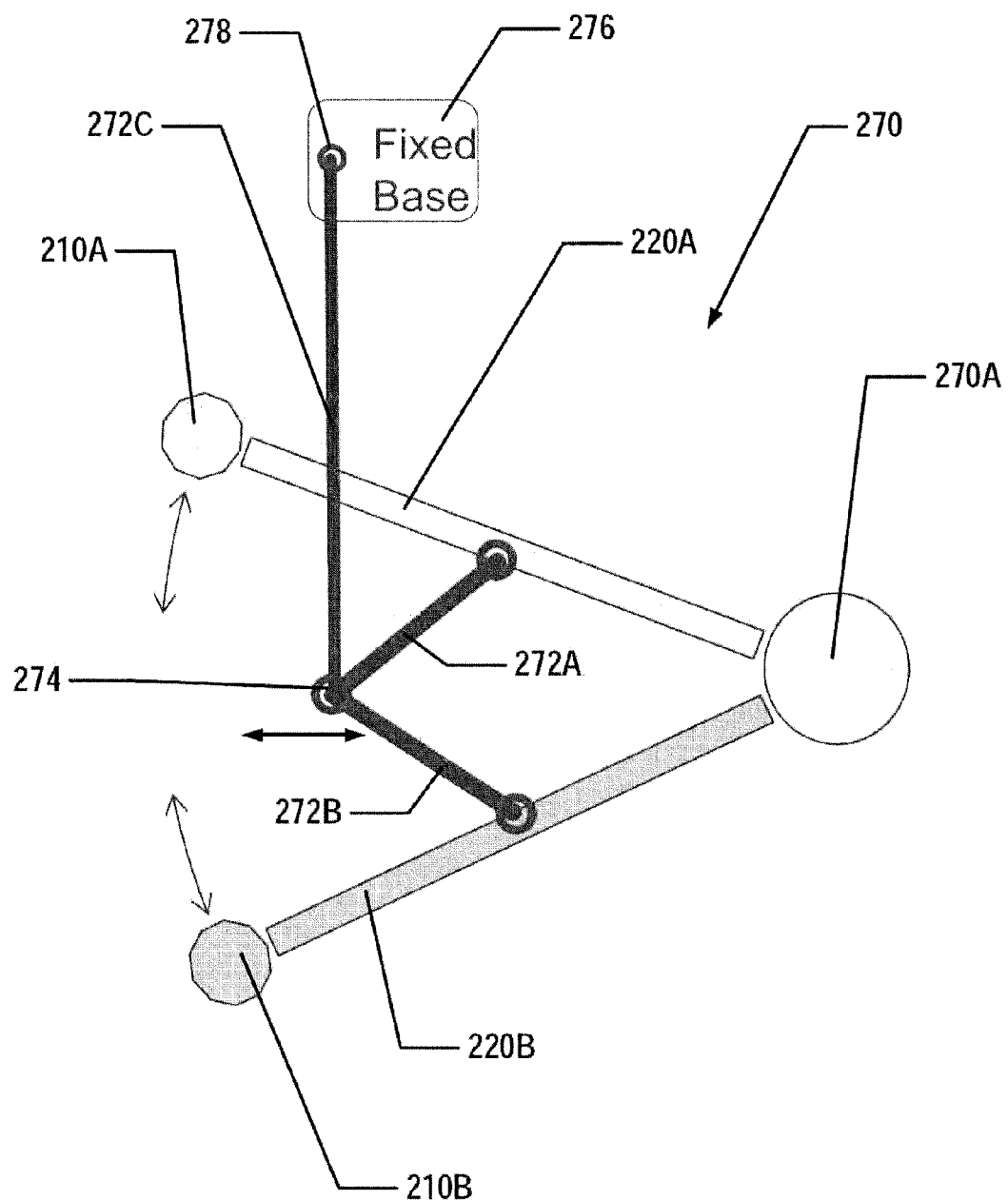
FIG. 5B illustrates a front plan view of an example phone holder showing another exemplary linkage system in accordance with this invention.

FIG. 5B illustrates a link arm linkage 270 between first grab post 210A and the second grab post 210B. As specifically illustrated in FIG. 5B, the arms 220A, 220B holding the first grab post 210A and the second grab post 210B are rotated symmetrically about their common axis 270A with a link arm linkage 270. For example, the link arm linkage 270 may include three link arms, 272A, 272B, 272C, a connecting point 274 and a fixed point 278 located on a fixed base 276. Link arm 272A may have endpoints on the first arm 220A and the connecting point 274. Link arm 272B may have endpoints on the second arm 220B and the connecting point 274. Link arm 272C may have endpoints on the fixed point 278 and the connecting point 274 and may define the left and right movement of the connecting point 274, which allows the arms 220A and 220B to move symmetrically. Generally, the fixed point 278 may be located centered above the connecting point 274. The first arm 220A and the second arm 220B may be connected with the secondary link arms 272A, 272B to the link point 274 and able to move laterally between the first arm 220A and the second arm 220B. The link point 274 must be located between the first arm 220A and the second arm 220B at a location equidistant from the first arm 220A and the second arm 220B.

As described above for both FIGS. 5A and 5B, the latch mechanism 116 may only need to latch one part of the gear linkage 250 or the arm linkage 270. The latch mechanism 116 may be ideally located near the spring mechanism that pushes the grab posts 210 towards the cell phone or mobile device 10. The latch mechanism 116 may have its own spring that resets when the user removes the cell phone or mobile device 10. The latch button 114 may depress a latch spring and the latch mechanism 116, which releases the arms 220A, 220B with the grab posts 210.

Figure 6C:
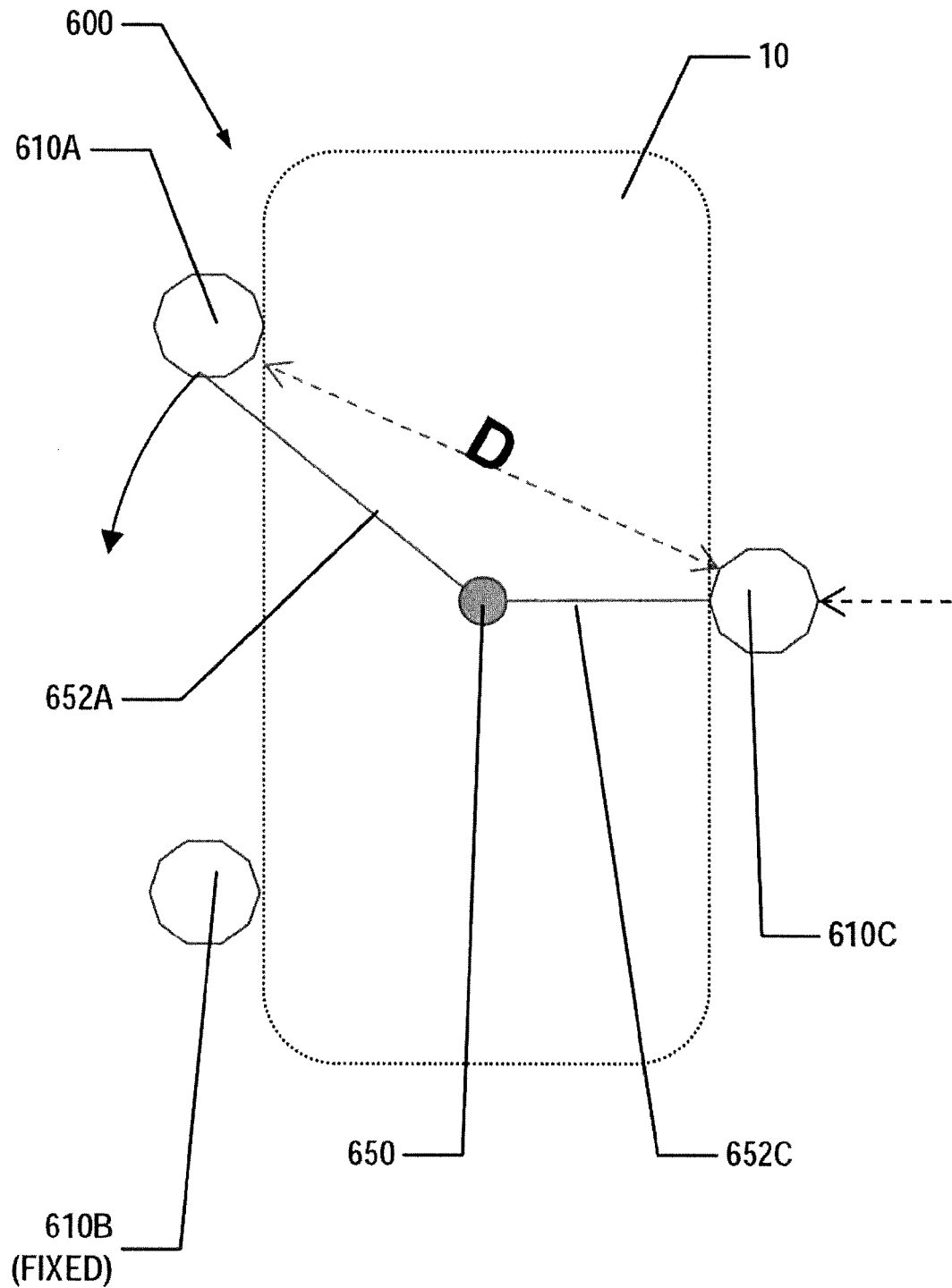
FIG. 6C illustrates a front plan view of another phone holder with a cell phone or mobile device in accordance with this invention.

FIGS. 6A through 6D illustrate an example according to this invention similar to that described above in conjunction with FIGS. 1 through 5B (the same or similar reference numbers are used in FIGS. 6A through 6C as those used in FIGS. 1 through 5B to denote the same or similar parts). As illustrated in FIGS. 6A through 6D, a phone holder 600 may include many of the same or similar features and components of the phone holder 100 as described above. The phone holder 600 may include only one arm moving as compared to the two moving arms of the phone holder 100 as described above. As illustrated in FIGS. 6A and 6B, the first grab post 610A rotates, while the second grab post 610B and the third grab post 610C are fixed. The phone holder 600 may require either counter-clockwise or clockwise direction of rotation to remove the cell phone or mobile device 10 from the phone holder 600. The counter-clockwise direction of rotation release would most like be chosen to utilize as opposed to clockwise rotation because of counter-clockwise rotation is utilized for unscrewing lids, bolts, screws, etc.

As illustrated in FIG. 6A, the third grab post 610C may be connected to an arm 620A with the first grab post 610A. For example, when removing the cell phone or mobile device 10 with clockwise rotation, the distance D from the first grab post 610A to the third grab 610C post must remain constant. The axis of rotation will be around the third grab post 610C.

As illustrated in FIG. 6B, in another embodiment or alternative geometric orientation of the grab posts 610, the third grab post 610C may be connected to an arm 632C sharing an axis 630 with an arm 632A to the first grab post 610A. In this embodiment, the rotation of the cell phone or mobile device 10 may be around the axis 630 in the center of the mount. In this embodiment, as illustrated in FIG. 6B, as the first grab post 610A rotates inwards, the third grab post 610C also rotates, thereby maintaining a constant distance D between the first grab post 610A and the third grab post 610C. As described above, when removing the cell phone or mobile device 10 with clockwise rotation, the distance D from the first grab post 610A to the third grab post 610C remains constant.

As illustrated in FIG. 6C, in another embodiment or alternative geometric orientation of the grab posts 610, the phone holder 600 may rotate about a center pivot point 650. The phone holder 600 may include a third grab post 610C that may be connected to an arm 652C sharing the axis with a first arm 652A to the first grab post 610A at the pivot point 650 in the center of the base plate 112. A spring mechanism may provide a linkage telescope between the third grab post 610C and the grab point 650. The third grab post 610C may telescope to assist with the tension of the first grab post 610A and the cell phone or mobile device 10. The first grab post 610A may rotate about the pivot point 650 in the center of the base plate 112 (depending on the rotation of the cell phone or mobile device 10). The spring mechanism may pull the third grab post 610C to the center pivot point 650 upon the engagement and/or pushing down of the latch button 114 during the engagement of the cell phone or mobile device 10 in the cradle 110 and engaging the latch mechanism 116. In this embodiment, as illustrated in FIG. 6C, as the first grab post 610A rotates inward, the third grab post 610C telescopes outward, thereby maintaining a constant distance D between the third grab post 610C and the rotating grab post 610A. When removing the cell phone or mobile device 10, the first grab post 610A rotates and the distance from the first grab post 610A to the third grab post 610C must remain constant.

Figure 6D:
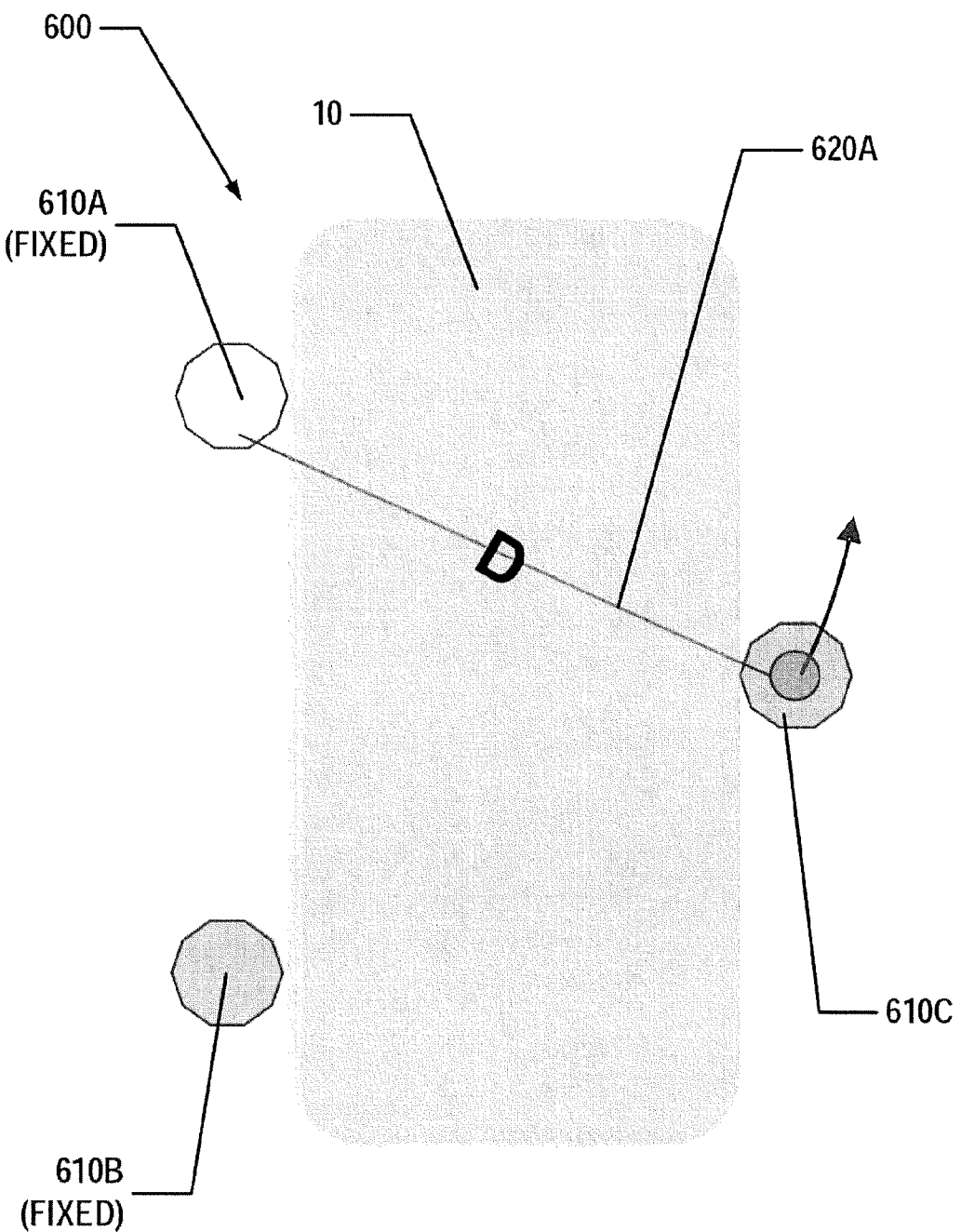
FIG. 6D illustrates a front plan view of another phone holder with a cell phone or mobile device in accordance with this invention.

As illustrated in FIG. 6D, in another embodiment or alternative geometric orientation of the grab posts 610, the third grab post 610C rotates, while the first grab post 610A and the second grab post 610B are fixed. The phone holder 600 may require either counter-clockwise or clockwise direction of rotation to remove the cell phone or mobile device 10 from the phone holder 600. The counter-clockwise direction of rotation release would most like be chosen to utilize as opposed to clockwise rotation because of counter-clockwise rotation is utilized for unscrewing lids, bolts, screws, etc. As illustrated in FIG. 6D, the third grab post 610C may be connected to an arm 620A with the first grab post 610A. For example, when removing the cell phone or mobile device 10 with clockwise rotation, the distance D from the first grab post 610A to the third grab 610C post must remain constant. The axis of rotation will be around the first grab post 610A.

Furthermore, as shown in FIG. 6D, the length of the long side of the cell phone or mobile device 10 must be greater than the distance between the first grab post 610A and the second grab post 601B. The width of the cell phone or mobile device 10 must be less than the distance between first grab post 610A and the third grab post 601C. The width of the cell phone or mobile device 10 must also be greater than a square root of $[d(610A, 610C)^2 - d(610A, 610B)^2]$ or else the third grab post 610C will tend to push the cell phone or mobile device 10 away from first grab post 610A. $d(610A, 610C)$=the distance from the first grab post 610A to the third grab post 610C. $d(610A, 610B)$=the distance from the first grab post 610A to the second grab post 610B.

Figure 7A:
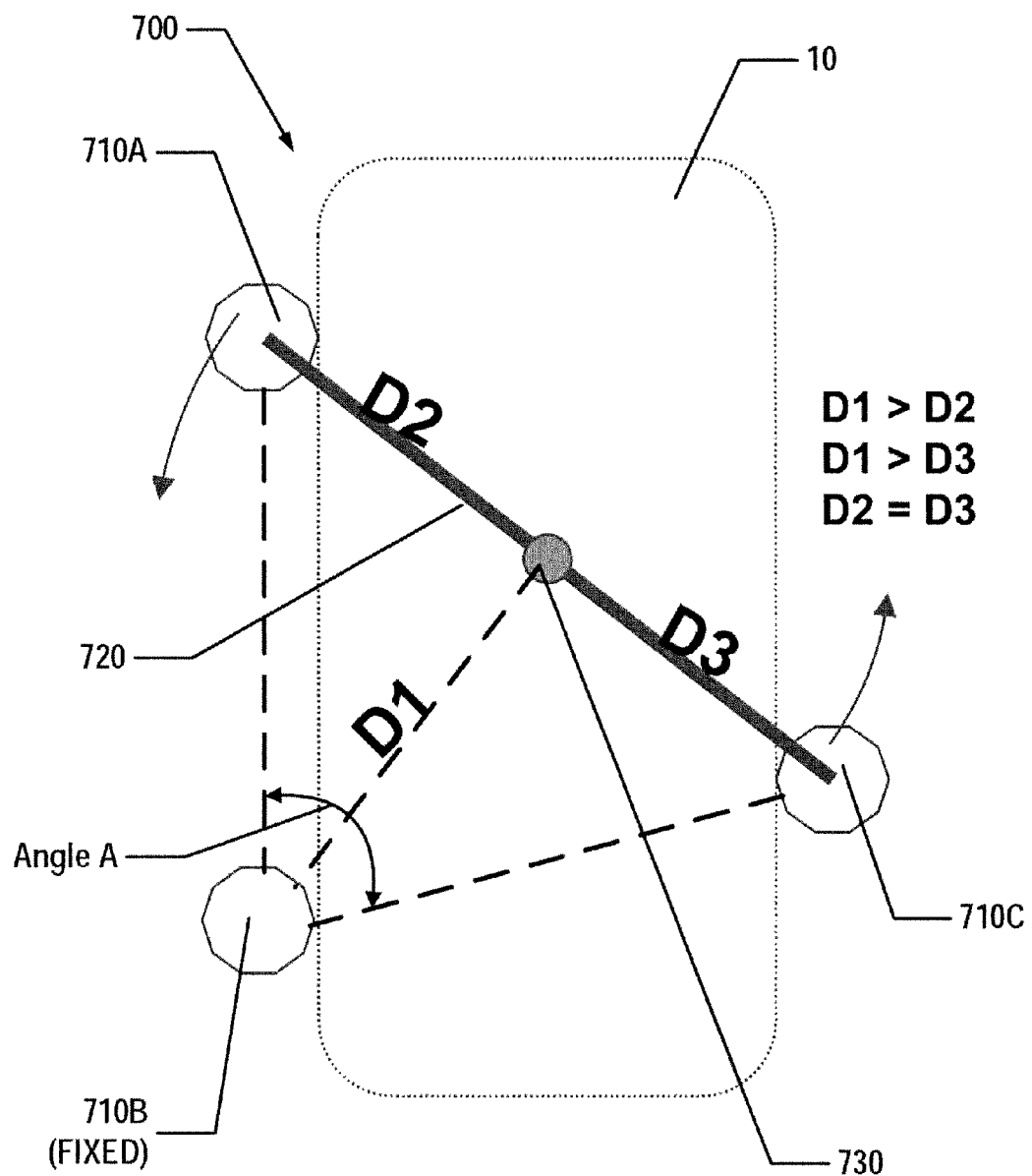
FIG. 7A illustrates a front plan view of another phone holder with a cell phone or mobile device in accordance with this invention.
Figure 7B:
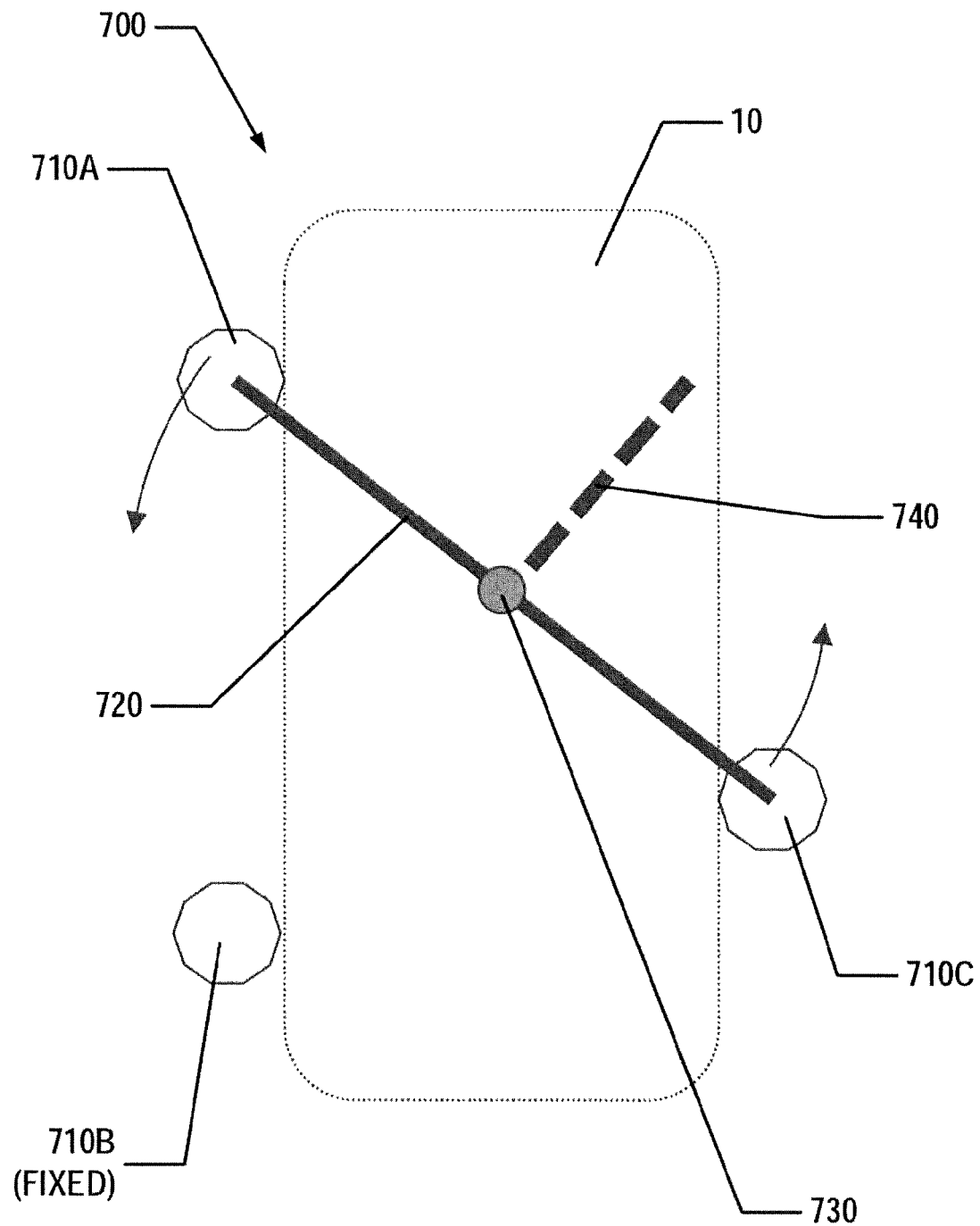
FIG. 7B illustrates a front plan view of another phone holder with a cell phone or mobile device in accordance with this invention.
Figure 7C:
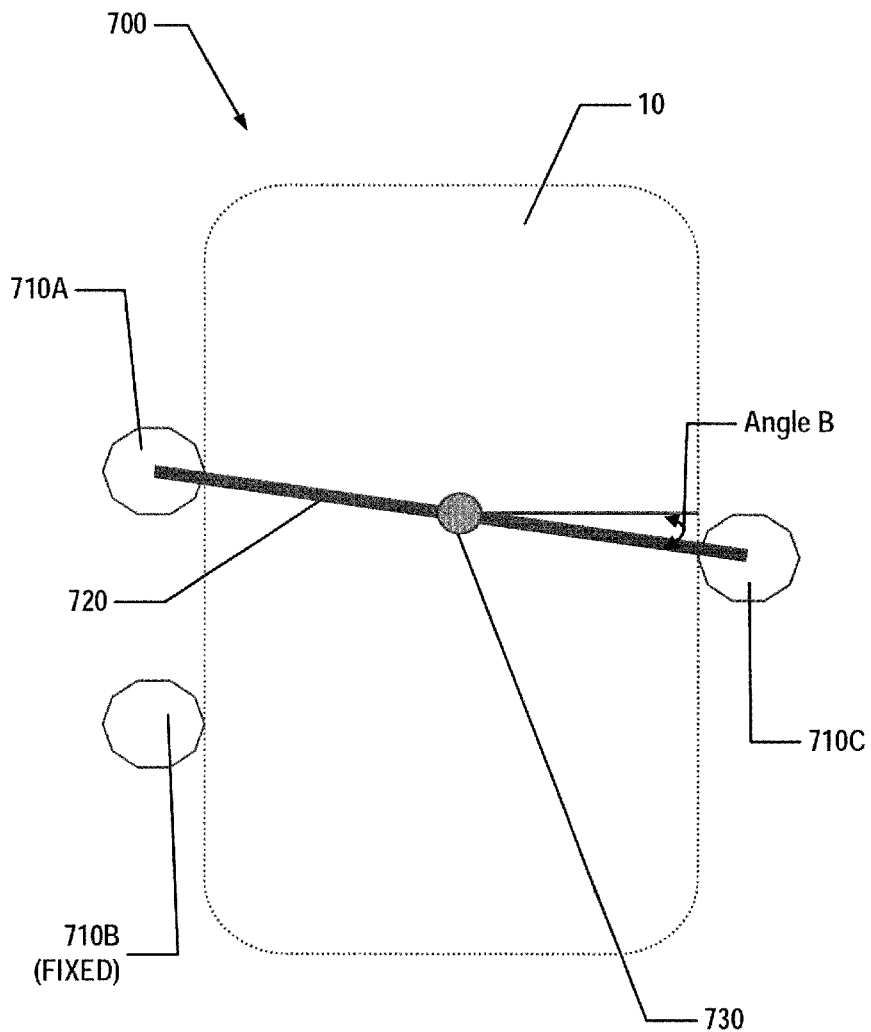
FIG. 7C illustrates a front plan view of another phone holder with a cell phone or mobile device in accordance with this invention.

FIGS. 7A through 7C illustrate another example according to this invention similar to that described above in conjunction with FIGS. 1 through 6C (the same or similar reference numbers are used in FIGS. 7A through 7C as those used in FIGS. 1 through 6C to denote the same or similar parts). As illustrated in FIGS. 7A through 7C, a phone holder 700 may include many of the same or similar features and components of the phone holder 100 as described above. As illustrated in FIGS. 7A through 7C, the phone holder 700 includes a midline center of rotation about an axis or pivot point 730 in the center of the phone holder 700, which grabs or holds the phone with the triangular securement system. The phone holder includes a solid bar 720 with two grab points, a first grab post 710A and a third grab post 710C grabbing both sides of the cell phone or mobile device 10. A second grab post 710B may remain fixed on the phone holder 700. As illustrated, the geometry of this phone holder 700 is such that a distance D1 from the center pivot point 730 to the fixed second grab post 710B is greater than the distance D2 from the center pivot point 730 to the first grab post 710A or the distance D3 from the center pivot point 730 to the third grab post 710C. Additionally, the distance D2 from the center pivot point 730 to the first grab post 710A is equal to the distance D3 from the center pivot point 730 to the third grab post 710C.

The first grab post 710A and third grab post 710C create an angle A at the second grab post 710B. Since the pivot point 730 is located in the midline of the cell phone or mobile device 10, the angle A is always acute. If angle A were to be obtuse, then the second grab post 710B would tend to push the cell phone or mobile phone 10 away from the first grab post 710A. Additionally, the second grab post 710B would get closer to the second grab post 710B, which as a result, the second grab post 710B and the third grab post 710C would form a two-point grab or hold of the cell phone or mobile device 10.

Table 3 below illustrates exemplary geometry and distances between the three grab posts 710A, 710B, 710C for the phone holder 700 illustrated in FIG. 7A. These dimensions are based on various example phone width distances and dimensions. The example phone dimensions are those of example cell phones or mobile devices as known and used in the art. Other phone dimensions with width and length may be utilized with this invention without departing from this invention. Generally, the distance from the first grab post 710A to the pivot point 730 is equal to the distance from the third grab post 710C to the pivot point 430. The distance from the pivot point 730 to the second grab post 710B is greater than the distance from the first grab post 710A to the pivot point 730. The distance from the pivot point 730 to the second grab post 710B is greater than the distance from the third grab post 710C to the pivot point 730. The bar 720, from grab post 710A to pivot point 730 to grab post 710C rotates about the pivot point 730.

Additionally, utilizing Pythagoras, the distance between the first grab post 410A and the second grab post 410B can be represented below:

$$d(A,B) = \text{sqrt}[d(A,D)^2 - (w/2)^2] + \text{sqrt}[d(B,D)^2 - (w/2)^2]$$

wherein:

d(A,B)—distance between grab post 710A and grab post 710B d(A,D)—distance between grab post 710A and pivot point 730 d(B,D)—distance between grab post 710B and pivot point 730 w—width of the cell phone or mobile device 10

TABLE 3

(corresponding to FIG. 7A)

| Cell phone width (w) [inches] | Cell phone height [inches] | d(A, D) [inches] | d(B, D) [inches] | d(A, B) [inches] |
|---|---|---|---|---|
| 2.78 | 5.38 | 1.5 | 3 | 3.22 |
| 2.75 | 5.38 | 1.5 | 3 | 3.27 |
| 3.12 | 5.95 | 1.6 | 3 | 2.92 |
| 2.57 | 4.96 | 1.5 | 3 | 3.48 |
| 3.17 | 5.95 | 1.6 | 3 | 2.77 |
| 2.85 | 5.59 | 1.5 | 3 | 3.11 |
| 2.32 | 4.49 | 1.5 | 3 | 3.72 |
| 2.22 | 4.4 | 1.5 | 3 | 3.80 |
| 2.69 | 5.41 | 1.5 | 3 | 3.35 |
| 2.5 | 4.7 | 1.5 | 3 | 3.56 |
| 2.31 | 4.54 | 1.5 | 3 | 3.73 |
| 2.64 | 5.44 | 1.5 | 3 | 3.41 |
| 3.06 | 6.22 | 1.6 | 3 | 3.05 |

FIG. 7B illustrates another embodiment of the current invention shown in FIG. 7A which illustrates a backing for larger cell phones or mobile devices 10 (such as a tablet or similar electronic device). For larger cell phones or mobiles devices 10, if a user is touching the tablet on the upper right corner (as illustrated in FIGS. 7A through 7C), this may cause some flexing of the larger cell phone or mobile device 10. In this embodiment, the phone holder may include some added support 740 along a line from the pivot point 730 in a direction away from the second grab post 710B. This added support 740 may be similar in length to the length of D3 or the distance from the third grab post 710C to the pivot point 730. With this geometry, the support 740 may not extend past the back of the larger cell phone or mobile device 10 and will improve the user's sense of stability of support for the larger cell phone or mobile device 10.

Additionally, the phone holder 700 may provide advantages for holding a wider phone. FIG. 7C illustrates the phone holder 700 holding a wider phone. Wider phones tend to be heavier because of their larger screen size. The phone holder 700 as described and detailed in FIGS. 7A and 7B, may enjoy additional holding power for two reasons. First, the extension of the spring between the grab posts 710. Angle B represents an angle between the horizontal across the cell phone and an arm 720 between the first grab post 710A and the third grab post 710C on the opposite side of the cell phone or mobile device 10. Generally, the spring force equal K*s (F=K*s), wherein K is the spring constant and s is the extension of the spring. Second, the holding force or grabbing force (W=Force*Distance) may be amplified by 1/sin (A). As illustrated in FIG. 7C, when using a wider phone, the angle A is small, so the sin (A) is also small, and thus 1/sin (A) is large.

Figure 8A:
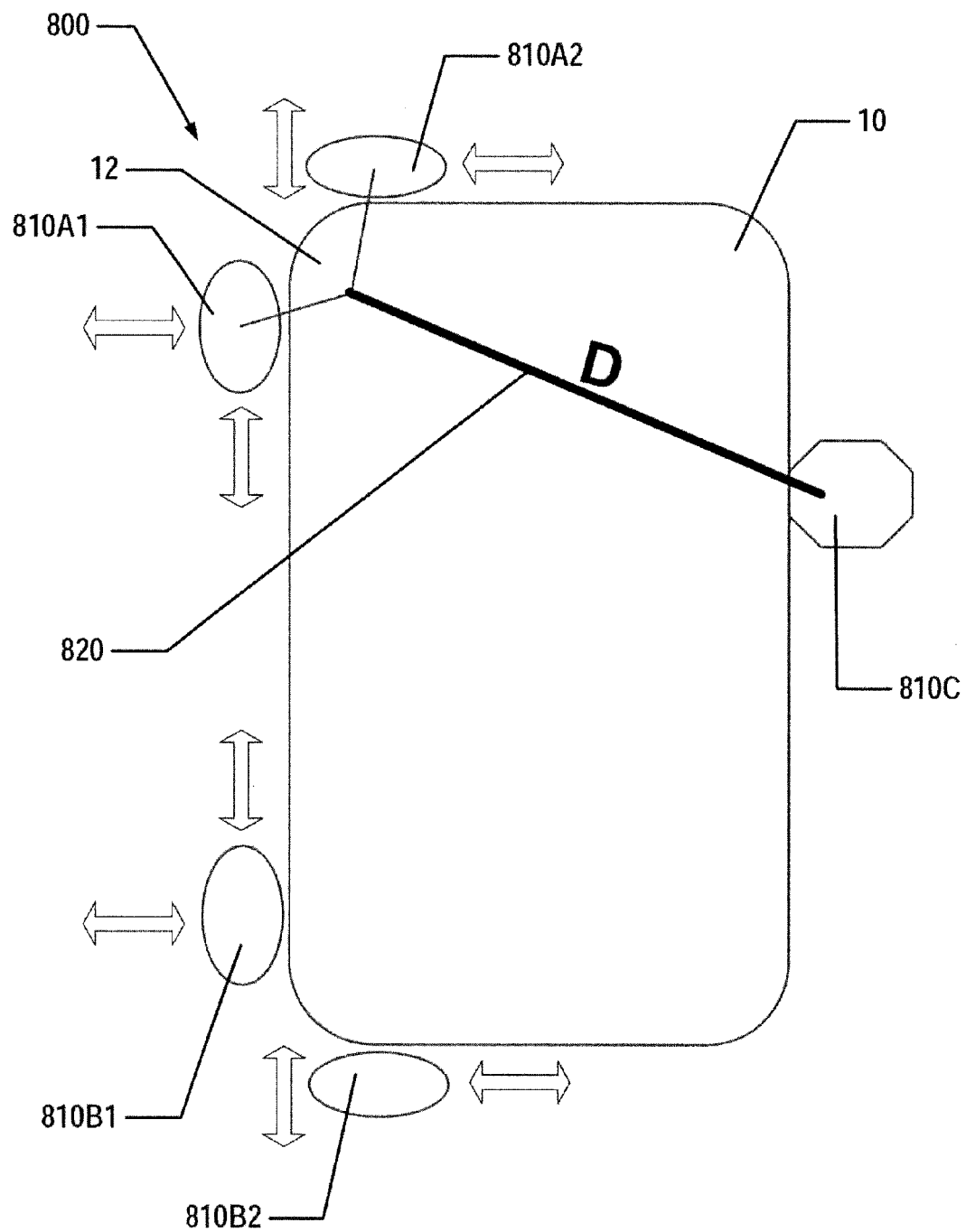
FIG. 8A illustrates a front plan view of another phone holder with a cell phone or mobile device in accordance with this invention.
Figure 8B:
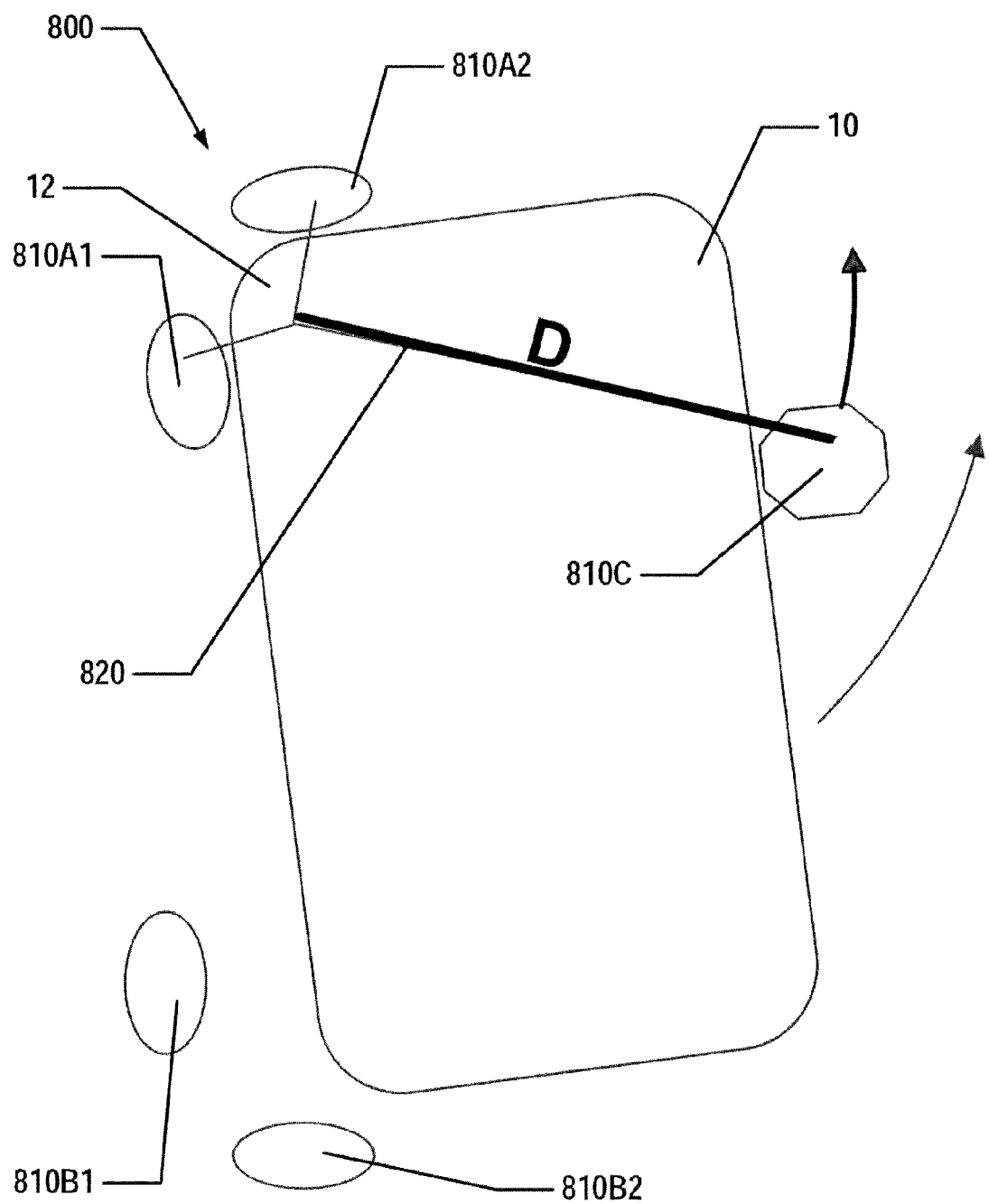
FIG. 8B illustrates a front plan view of the example phone holder shown in FIG. 8A showing the phone holder rotated in accordance with this invention.

FIGS. 8A and 8B illustrate an example according to this invention similar to that described above in conjunction with FIGS. 1A through 7C (the same or similar reference numbers are used in FIGS. 8A and 8B as those used in FIGS. 1A through 7C to denote the same or similar parts). As illustrated in FIGS. 8A and 8B, a phone holder 800 may include many of the same or similar features and components of the phone holder 100 as described above. The phone holder 800 may include a triangular hold system that includes a pair of corner grab posts that each include dual grab posts.

As illustrated in FIGS. 8A and 8B, the phone holder 800 may include first dual grab posts 810A1, 810A2 located on an upper corner of the phone holder 800 and capable of holding or grabbing the cell phone or mobile device 10 on its upper corner. The phone holder 800 may also include second dual grab posts 810B1, 810B2 located on a lower corner of the phone holder 800 and capable of holding or grabbing the cell phone or mobile device 10 on its lower corner. The dual grab posts 810A and 810B may be shaped to fit on the corners of the cell phone or mobile device 10. Additionally, each individual dual grab post 810A1, 810A2, 810B1, 810B2 may be adjustable for the height and the width of the cell phone or mobile device 10 as illustrated with the arrows in FIG. 8A. Any biasing or resilient connection for the dual grab posts 810A, 810B to allow for the adjustability may be utilized as known and used in the art. A third grab post 810C may be positioned to contact and engage on the opposite long side of the first dual grab posts 810A1, 810A2 and the second dual grab post 810B1, 810B2. Additionally, the third grab post 810C may be adjustable for the width of the cell phone or mobile device 10, allowing a minimum and maximum distance for the width of the cell phone or mobile device 10.

As shown in FIGS. 8A and 8B, the dual grab posts 810A, 810B may be oval in shape. The dual grab posts 810A, 810B may be other shapes without departing from the invention, such as, circular, half moon, square, hexagon, octagonal, or other irregular shapes without departing from this invention. Additionally, the dual grab posts 810 may also include flat areas. The grab post 810C shown in FIGS. 8A and 8B is circular in shape but has eight flat sides to the circular post. The grab post 810C (and/or dual grab posts 810A, 810B) may include other numbers of flat sides without departing from the invention. The flat sides on the grab posts 810 may help to hold or grip the sides of the cell phone or mobile device 10. Additionally, the grab posts 810 may be made of any resilient material, such as a soft rubber material without departing from this invention. Other materials may be utilized for the grab posts 810 without departing from this invention.

As illustrated in FIGS. 8A and 8B, to release the cell phone or mobile device 10, the third grab post 810C rotates, while the first grab posts 810A1, 810A2 and the second grab posts 810B1, 810B2 are fixed. The phone holder 800 may require either counter-clockwise or clockwise direction of rotation to remove the cell phone or mobile device 10 from the phone holder 800. The counter-clockwise direction of rotation release would most like be chosen to utilize as opposed to clockwise rotation because of counter-clockwise rotation is utilized for unscrewing lids, bolts, screws, etc. As illustrated in FIG. 8B, the third grab post 810C may be connected to an arm 820 that is connected with the first grab posts 810A1, 810A2.

For example, when removing the cell phone or mobile device 10 with counter-clockwise rotation, the distance D from the first grab posts 810A1, 810A2 to the third grab 810C post must remain constant. The axis of rotation will be at (or near) a corner 12 of the cell phone or mobile device 10 near the first grab posts 810A1, 810A2. This corner 12 of the cell phone or mobile device 10 may be defined further by the point of intersection of a line defining the first side of the cell phone or mobile device 10 and the line defining the top side (or bottom side for a corner near the second grab posts 810B1, 810B2 for clockwise rotation). If the point of rotation is nearer the center line when rotating counter-clockwise about the first grab posts 810A1, 810A2, the bottom of the cell phone or mobile device 10 would come closer to the second grab posts 810B1, 810B2 and cause friction.

Additionally, to assist with the elimination of friction, the individual dual grab posts 810A1, 810A2, 810B1, 810B2 may be free to rotate a small amount to eliminate a sensation of sliding against a rubber grip when releasing the cell phone or mobile device 10. The individual dual grab posts 810A1, 810A2, 810B1, 810B2 may rotate as much as the range of the rotation to release the cell phone or mobile device 10 and enough to keep the dual grab posts 810A1, 810A2, 810B1, 810B2 in orientation so that the bottom post 810B2 is not higher than the side post 810B1 and enough so that the bottom post 810B2 is not "outside" the side post 810B1 and away from the side of the phone so that the side post 810B1 moves "away" from 810A1.

As illustrated in FIGS. 8A and 8B, the length of the long side of the cell phone or mobile device 10 may be limited by the adjustability of the dual grab posts 810A and 810B. The width of the cell phone or mobile device 10 must be less than the distance between first dual grab post 810A and the third grab posts 810C, and the width must be greater than a square root of $[d(810A, 810C)^2 - d(810A, 810B)^2]$ or else the third grab post 810C will tend to push the cell phone or mobile device 10 away from first dual grab post 810A. d(810A, 810C)=the distance from the first dual grab post 810A to the third grab post 810C. d(810A, 810B)=the distance from the first dual grab post 810A to the second dual grab post 810B.

Figure 9A:
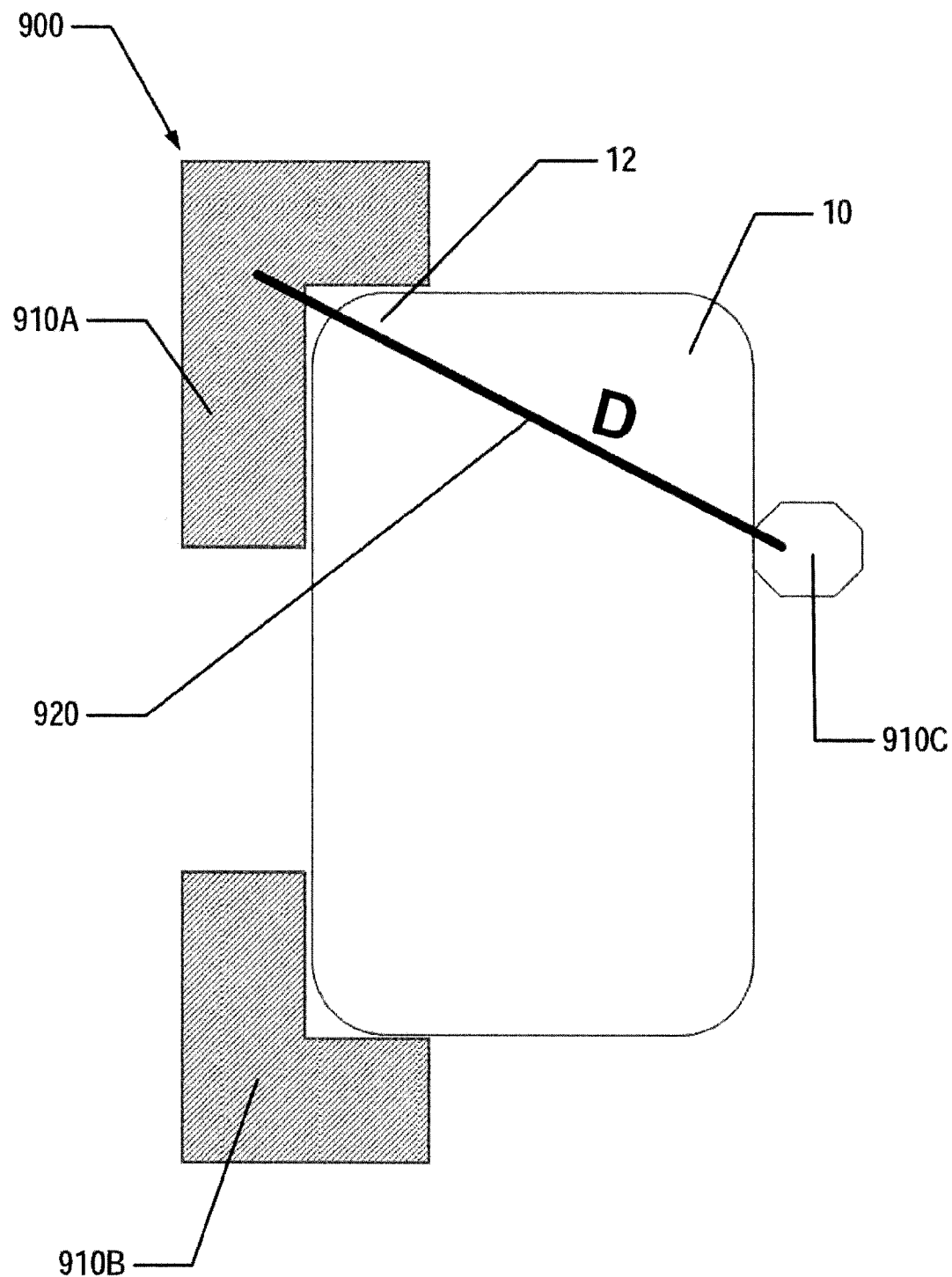
FIG. 9A illustrates a front plan view of another phone holder with a cell phone or mobile device in accordance with this invention.
Figure 9B:
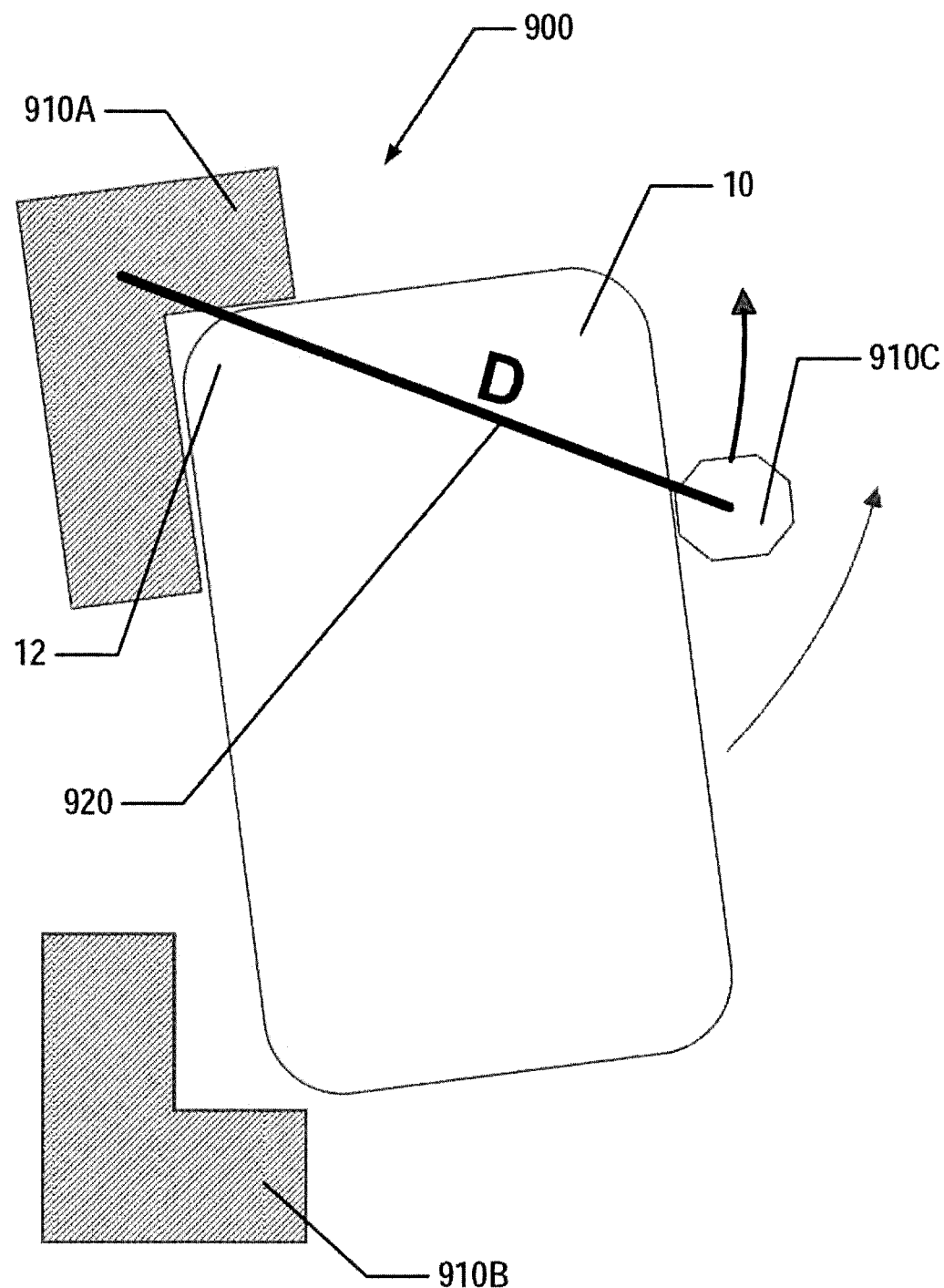
FIG. 9B illustrates a front plan view of the example phone holder shown in FIG. 9A showing the phone holder rotated in accordance with this invention.

FIGS. 9A and 9B illustrate an example according to this invention similar to that described above in conjunction with FIGS. 1A through 8B (the same or similar reference numbers are used in FIGS. 9A and 9B as those used in FIGS. 1A through 8B to denote the same or similar parts). As illustrated in FIGS. 9A and 9B, a phone holder 900 may include many of the same or similar features and components of the phone holder 100 as described above. The phone holder 900 may include a triangular hold system that includes a pair of corner supports and a single grab post opposite the pair of corner supports.

As illustrated in FIGS. 9A and 9B, the phone holder 900 may include a first corner support 910A located on an upper corner of the phone holder 900 and capable of holding or grabbing the cell phone or mobile device 10 on its upper corner. The phone holder 900 may also include second corner support 910B located on a lower corner of the phone holder 900 and capable of holding or grabbing the cell phone or mobile device 10 on its lower corner. The corner supports 910A, 910B may be shaped to fit on the corners of the cell phone or mobile device 10. Additionally, each corner support 910A, 910B may be adjustable for the height and the width of the cell phone or mobile device 10. Any biasing or resilient connection for the corner supports 910A, 910B to allow for the adjustability may be utilized as known and used in the art.

The phone holder 900 may also include a grab post 910C. The grab post 910C may be positioned to contact and engage on the opposite long side of the first corner support 910A and the second corner support 910B. Additionally, the grab post 910C may be adjustable for the width of the cell phone or mobile device 10, allowing a minimum and maximum distance for the width of the cell phone or mobile device 10.

As shown in FIGS. 9A and 9B, the corner supports 910A, 910B may be shaped in the form of an "L" to match the corners of the cell phone or mobile device 10. Additionally, the corner supports 910A, 910B may be other shapes to match the corners of the cell phone or mobile device 10 such as, circular, half moon, square, hexagon, octagonal, or other irregular shapes without departing from this invention. The corner supports 910A, 910B may be made of any resilient material, such as a soft rubber material or plastics without departing from this invention. Additionally, without departing from this invention, the corner supports 910A, 910B may be made of harder materials, such as metals or combinations of other materials. Other materials may be utilized for the corner supports 910A, 910B without departing from this invention. The grab post 910C shown in FIGS. 9A and 9B is circular in shape but has eight flat sides to the circular post. The grab post 910C may include other numbers of flat sides without departing from the invention. The flat sides on the grab post 910C may help to hold or grip the sides of the cell phone or mobile device 10. Additionally, the grab post 910C may be made of any resilient material, such as a soft rubber material without departing from this invention. Other materials may be utilized for the grab post 910C without departing from this invention.

As illustrated in FIGS. 9A and 9B, to release the cell phone or mobile device 10, the grab post 910C rotates, while the first corner support 910A and the second corner support 910B are fixed. The phone holder 900 may require either counter-clockwise or clockwise direction of rotation to remove the cell phone or mobile device 10 from the phone holder 800. The counter-clockwise direction of rotation release would most like be chosen to utilize as opposed to clockwise rotation because of counter-clockwise rotation is utilized for unscrewing lids, bolts, screws, etc. As illustrated in FIG. 9B, the grab post 910C may be connected to an arm 920 that is connected with the first corner support 910A.

For example, when removing the cell phone or mobile device 10 with counter-clockwise rotation, the distance D from the first corner support 910A to the grab post 910C must remain constant. The axis of rotation will be at (or near) a corner 12 of the cell phone or mobile device 10 near the first corner support 910A. This corner 12 of the cell phone or mobile device 10 may be defined further by the point of intersection of a line defining the first side of the cell phone or mobile device 10 and the line defining the top side (or bottom side for a corner near the second corner support 910B for clockwise rotation). If the point of rotation is nearer the center line, when rotating counter-clockwise about the first corner support 910A, the bottom of the cell phone or mobile device 10 would come closer to the second corner support 910B and cause friction. Additionally, to assist with the elimination of friction, the corner supports 910A, 910B may be free to rotate a small amount to eliminate a sensation of sliding against a rubber grip when releasing the cell phone or mobile device 10.

As illustrated in FIGS. 9A and 9B, the length of the long side of the cell phone or mobile device 10 may be limited by the adjustability of the corner supports 910A and 910B. The width of the cell phone or mobile device 10 must be less than the distance between first corner support 910A and the grab post 910C, and the width must be greater than a square root of $[d(910A, 910C)^2 - d(910A, 910B)^2]$ or else the grab post 910C will tend to push the cell phone or mobile device 10 away from first corner support 910A. d(910A, 910C)=the distance from the first corner support 910A to the grab post 910C. d(910A, 910B)=the distance from the first corner support 910A to the second corner support 910B.

The triangular hold system as illustrated in FIGS. 1A through 9B and described above provides a more stable securement than a two-point hold system. The triangular hold system does not cover any of the top or bottom buttons 20 or connectors 30 of the cell phone or mobile device 10 because none of the grab posts engage the cell phone or mobile device 10 at the top or bottom.

Additionally, the triangular hold system also mimics the human hand hold. For example, any phone design must include button-less spaces on both sides of the cell phone or mobile device 10 to hold the cell phone or mobile device 10. There may be a high likelihood that the phone holder as described in this invention will work with more models of cell phones or mobile phones 10 than other designs.

In another embodiment, the phone holder 100 may include a magnetic system to hold and/or secure the cell phone or mobile device 10. The magnetic system may be attached to, engaged with, or connected to the cradle 110 in a variety of methods known and used in the art. The magnetic system may be located on or internal to the base plate 112. The magnetic system may include one or more magnets that magnetically attract and hold or secure the cell phone or mobile device 10 in the phone holder 100. The magnetic system may be a stand-alone holder of the cell phone or mobile device 10 with the phone holder 100. Additionally, the magnetic system may work together with the other triangular hold systems as described in FIGS. 1A through 9B to hold and secure the cell phone or mobile device 10. The magnetic system may also include one or more magnets located on the grab posts 210, the grab arms 220 and/or the corner supports 910. The magnets located on the grab posts 210, the grab arms 220 and/or the corner supports 910 may also work together with the triangular hold system as described in FIGS. 1A through 9B to hold and secure the cell phone or mobile device 10.

The magnetic system may include one or more magnets that magnetically attract to a ferrous object like pieces of iron, steel, nickel and cobalt of the cell phone or mobile device 10. Additionally, the cell phone or mobile device 10 may not include a ferrous object with pieces of iron, steel, nickel and cobalt. In these instances, a separate ferrous plate or other shaped object with pieces of iron, steel, nickel and/or cobalt may be utilized and attached to the cell phone or mobile device 10. The ferrous plate may be attached to cell phone or mobile device 10 by means known and used in the art, such as adhesives, mechanical connections, or other methods.

CONCLUSION

The present invention is disclosed above and in the accompanying drawings with reference to a variety of examples. The purpose served by the disclosure, however, is to provide an example of the various features and concepts related to the invention, not to limit the scope of the invention. One skilled in the relevant art will recognize that numerous variations and modifications may be made to the aspects described above without departing from the scope of the present invention, as defined by the appended claims.

We claim:

1. A mobile device holder for holding a mobile device in a vehicle, the holder including:
   a cradle configured to receive a mobile device, wherein the cradle includes a base plate, a latch button, and a latch mechanism, wherein the latch button and the latch mechanism are defined on the base plate; and
   a triangular hold securement system connected to the cradle, wherein the triangular hold securement system includes a first pair of dual grab posts, a second pair of dual grab posts, and a third grab post,
   wherein the first pair of dual grab posts and the second pair of dual grab posts are positioned to contact and engage the corners along one of two long sides of the mobile device and the third grab post is positioned to contact and engage on the opposite long side of the mobile device, wherein the first pair of dual grab posts include a first corner post located on a top side of the mobile device and a second corner post located on a first side of the mobile device and the second pair of dual grab posts include a third corner post located on a bottom side of the mobile device and a fourth corner post located on the first side of the mobile device, and further wherein the first grab post and third grab post are connected and further wherein one or more of the grab posts are fixed,
   wherein when a mobile device is inserted into the cradle, the mobile device depresses the latch button and releases the latch mechanism thereby releasing the arm and biasing the grab posts towards the mobile device and securing the mobile device to the cradle, and
   further wherein after a mobile device is secure in the cradle and when the mobile device is rotated, an axis of rotation is about a corner of the mobile device near the first pair of dual grab posts or the second pair of dual grab posts to change the geometry of the grab posts such that the mobile device is released from the cradle.

2. A mobile device holder according to claim 1, wherein the first pair of dual grab posts and the third grab post are connected by an arm and wherein when rotating the mobile device from a secure position in the cradle, the third grab post rotates while the first pair of dual grab posts and the second pair of dual grab posts remain fixed and the distance from the first pair of dual grab posts to the third grab post remains constant.

3. A mobile device holder according to claim 2, wherein the third grab post rotates about an axis of rotation around the first pair of dual grab posts in the direction of the mobile device rotation.

4. A mobile device holder according to claim 1, wherein the grab posts angle inwards towards the mobile device.

5. A mobile device holder according to claim 1, wherein the grab posts are circular-shaped and made of a soft rubber material.

6. A mobile device holder according to claim 1, wherein the first pair of dual grab posts and the second pair of dual grab posts are oval-shaped.

7. A mobile device holder according to claim 1, wherein one or more of the corner posts are free to rotate.

8. A mobile device holder according to claim 1, wherein the first pair of dual grab posts and the second pair of dual grab posts are adjustable to a height and a width of the mobile device.

9. A phone holder for holding a cell phone in a vehicle, the phone holder including:
   a cradle configured to receive a cell phone, wherein the cradle includes a base plate, a latch button, and a latch mechanism, wherein the latch button and the latch mechanism are defined on the base plate; and
   a triangular hold securement system connected to the cradle, wherein the triangular hold securement system includes a first pair of dual grab posts, a second pair of dual grab posts, and a third grab post,
   wherein the first pair of dual grab posts include two corner posts positioned to contact and engage on a top corner of the cell phone along a first long side of the cell phone, the second pair of dual grab posts include two corner posts positioned to contact and engage a bottom corner of the cell phone along the first long side of the cell phone and the third grab post is positioned to contact and engage along a second long side of the cell phone opposite the first long side, and further wherein the first pair of dual grab posts and the third grab post are connected by an arm and a biasing element, wherein the arm, the biasing element, and the grab posts secure the cell phone to the cradle, wherein after a cell phone is secure in the cradle and when the cell phone is rotated, the third grab post rotates about a corner of the cell phone near one of the first pair of dual grab posts or the second pair of dual grab posts to change the geometry of the grab posts such that the cell phone is released from the cradle.

10. A phone holder according to claim 9, wherein the two corner posts of the first pair of dual grab posts include a first corner post located on a top side of the cell phone and a second corner post located on the first side of the cell phone and the two corner posts of the second pair of dual grab posts include a third corner post located on a bottom side of the cell phone and a fourth corner post located on the first side of the cell phone.

11. A phone holder according to claim 10, wherein one or more of the corner posts are free to rotate.

12. A phone holder according to claim 9, wherein the first pair of dual grab posts and the second pair of dual grab posts are adjustable to a height and a width of the cell phone.

13. A phone holder according to claim 9, wherein the first pair of dual grab posts and the second pair of dual grab posts are oval-shaped.

14. A phone holder according to claim 9, wherein the third grab post is circular-shaped and made of a soft rubber material.

15. A mobile device holder for holding a mobile device in a vehicle, the holder including:
   a cradle configured to receive a mobile device, wherein the cradle includes a base plate, a latch button, and a latch mechanism, wherein the latch button and the latch mechanism are defined on the base plate; and
   a triangular hold securement system connected to the cradle, wherein the triangular hold securement system includes a first corner support, a second corner support, and a grab post,
   wherein the first corner support is positioned to contact and engage a top corner of the mobile device along a top and a first long side of the mobile device, the second corner support is positioned to contact and engage a bottom and the first long side of the mobile device, and the grab post is positioned to contact and engage along a second long side of the mobile device opposite the first long side, and further wherein one of the corner supports is connected by one or more arms and a linkage element to the grab post which provides biasing forces to the corner supports and the grab post to secure the mobile device to the cradle,
   wherein when a mobile device is inserted into the cradle, the mobile device depresses the latch button and releases the latch mechanism thereby releasing the one or more arms and biasing the corner supports and the grab post towards the mobile device and securing the mobile device to the cradle, and
   further wherein after a mobile device is secure in the cradle and when the mobile device is rotated, the first corner support and the second corner support remains fixed while the grab post rotates about an axis of rotation around a corner near the first corner support in the direction of the mobile device rotation such that the mobile device is released from the cradle.

16. A mobile device holder according to claim 15, wherein the first corner support and the second corner support are adjustable to a height and a width of the mobile device.

17. A mobile device holder according to claim 15, wherein when the mobile device is rotated, the grab post rotates, maintaining a constant distance between the grab post and the first corner support.

18. A mobile device holder according to claim 15, wherein the first corner support and the second corner support are "L"-shaped.

19. A mobile device holder according to claim 15, wherein the grab post angles inwards towards the mobile device.

20. A mobile device holder according to claim 15, wherein the grab post is circular-shaped and made of a soft rubber material.

* * * * *